United States Patent
Herold et al.

(10) Patent No.: US 7,603,413 B1
(45) Date of Patent: Oct. 13, 2009

(54) USING AUTOMATED AGENTS TO FACILITATE CHAT COMMUNICATIONS

(75) Inventors: June R. Herold, Falls Church, VA (US); William P. Schreiner, Reston, VA (US)

(73) Assignee: AOL LLC, Dulles, VA (US)

( * ) Notice: Subject to any disclaimer, the term of this patent is extended or adjusted under 35 U.S.C. 154(b) by 547 days.

(21) Appl. No.: 11/279,091

(22) Filed: Apr. 7, 2006

Related U.S. Application Data

(60) Provisional application No. 60/668,971, filed on Apr. 7, 2005.

(51) Int. Cl.
| | |
|---|---|
| *G06F 15/16* | (2006.01) |
| *G06F 3/00* | (2006.01) |
| *H04W 4/00* | (2009.01) |
| *H04B 7/00* | (2006.01) |

(52) U.S. Cl. .................. 709/204; 709/205; 709/207; 709/217; 715/758; 455/466; 455/519

(58) Field of Classification Search .................. 709/204
See application file for complete search history.

(56) References Cited

U.S. PATENT DOCUMENTS

| | | | |
|---|---|---|---|
| 5,598,351 A | 1/1997 | Chater | |
| 5,754,939 A * | 5/1998 | Herz et al. .................. | 455/3.04 |
| 5,880,731 A | 3/1999 | Liles | |
| 6,029,195 A * | 2/2000 | Herz .......................... | 725/116 |
| 6,256,664 B1 | 7/2001 | Donoho | |
| 6,259,969 B1 * | 7/2001 | Tackett et al. ............... | 700/264 |
| 6,480,885 B1 * | 11/2002 | Olivier ....................... | 709/207 |
| 6,564,244 B1 | 5/2003 | Ito | |
| 6,735,568 B1 | 5/2004 | Buckwalter | |
| 6,912,521 B2 | 6/2005 | Kraft | |
| 6,934,739 B2 | 8/2005 | Pietila | |
| 6,938,068 B1 | 8/2005 | Kraft | |
| 6,938,069 B1 | 8/2005 | Narayanaswamy | |
| 6,963,900 B2 | 11/2005 | Boyd | |

(Continued)

FOREIGN PATENT DOCUMENTS

WO    WO 01/98856    12/2001

OTHER PUBLICATIONS

Social Information Filtering: Algorithms for Automating "Word of Mouth," Shardanand et al., 1995.*

(Continued)

*Primary Examiner*—Firmin Backer
*Assistant Examiner*—Patrick Nagel
(74) *Attorney, Agent, or Firm*—Fish & Richardson P.C.

(57) ABSTRACT

An automated agent, such as an instant message robot, is be used to facilitate introduction of a chat participant to a small group of other chat participants in a chat room. To do so, for example, a BOT may present a chat participant who desires to be introduced to a small group of chat participants in a chat room with a series of multiple-choice questions, identify a subset of chat participants based on responses to the multiple-choice questions, and provide introductions among the chat participants in the subset to facilitate conversation therebetween. For example, the introductions provided by the BOT may indicate areas of mutual interest among chat participants in the subset, similar responses to one or more multiple-choice questions, and/or diverse responses to one or more multiple-choice questions.

37 Claims, 21 Drawing Sheets

U.S. PATENT DOCUMENTS

| | | | | |
|---|---|---|---|---|
| 2002/0178163 | A1* | 11/2002 | Mayer | 707/10 |
| 2003/0065721 | A1* | 4/2003 | Roskind | 709/204 |
| 2003/0093405 | A1 | 5/2003 | Mayer | |
| 2003/0182391 | A1* | 9/2003 | Leber et al. | 709/217 |
| 2003/0220972 | A1* | 11/2003 | Montet et al. | 709/204 |
| 2004/0019637 | A1* | 1/2004 | Goodman et al. | 709/204 |
| 2004/0064335 | A1* | 4/2004 | Yang | 705/1 |
| 2004/0117444 | A1* | 6/2004 | Goodman et al. | 709/204 |
| 2004/0122810 | A1* | 6/2004 | Mayer | 707/3 |
| 2004/0128353 | A1* | 7/2004 | Goodman et al. | 709/204 |
| 2004/0249811 | A1* | 12/2004 | Shostack et al. | 707/5 |
| 2005/0015350 | A1* | 1/2005 | Foderaro | 706/20 |
| 2005/0055416 | A1* | 3/2005 | Heikes et al. | 709/207 |
| 2005/0086211 | A1* | 4/2005 | Mayer | 707/3 |
| 2005/0288944 | A1* | 12/2005 | Leman et al. | 705/1 |
| 2006/0069546 | A1* | 3/2006 | Rosser et al. | 704/9 |
| 2006/0253458 | A1* | 11/2006 | Dixon et al. | 707/10 |
| 2006/0253578 | A1* | 11/2006 | Dixon et al. | 709/225 |
| 2006/0253581 | A1* | 11/2006 | Dixon et al. | 709/225 |
| 2006/0253583 | A1* | 11/2006 | Dixon et al. | 709/225 |
| 2006/0253584 | A1* | 11/2006 | Dixon et al. | 709/225 |
| 2008/0109473 | A1* | 5/2008 | Dixon et al. | 707/102 |
| 2008/0114709 | A1* | 5/2008 | Dixon et al. | 706/13 |

OTHER PUBLICATIONS

Guided Communication of the eHarmony Dating Service, Jason Griffin, Aug. 19, 2005.*

Ethics for Bots, Miranda Mowbray, Feb. 28, 2005.*

Yenta: a Multi-Agent, Referral-Based Matchmaking System, Leonard N. Foner, 1997.*

Find Me a File, Cache Me a Catch, NY Times, Anne Eisenberg, Feb. 10, 2000.*

Cabot in LambdaMOO: A Social Statistics Agent, Isbell et al., 2000.*

Robot-Mediated Communications: Robots Promoting Matchmaking between Humans, Ono et al., 1999.*

Match.com, "Introducing Chemistry.com" press release, Oct. 11, 2005, Http://corp.match.com/index/newscenter_release_detail. asp?auto_index=94 last visited Nov. 17, 2005, (2 pages).

eHarmony.com, "Expert Guidance," http://www.eharmony.com/singles/servlet/about/communication last visited Nov. 17, 2005, (1 page).

eHarmony.com, "Why eHarmony?" http://www.eharmony.com/singles/servlet/about/difference last visited Nov. 17, 2005, (2 pages).

Steve Carter, Ph.D., et al., "Helping Singles Enter Better Marriages Using Predictive Models of Marital Success", © 2004 eHarmony. com®, pp. 1-7.

* cited by examiner

200C

HostBOT: Good evening. Welcome to the chat room. Before we begin, I'd like to ask you a few questions. Then, I'll introduce you to small groups of people tonight that you'll like getting to know, based on what I learn about you. Ready? ~213

NewChatParticipant: (Yes) ~227

HostBOT: If you were a dog breed, what would you be? ~235
A. Poodle   B. Labrador Retriever   C. Jack Russell Terrier
D. Bassett Hound   E. Cocker Spaniel   F. Pit Bull NewChatParticipant: (E. Cocker Spaniel) ~247

HostBOT: Which breed do you want to play with? ~250
A. Poodle   B. Labrador Retriever   C. Jack Russell Terrier
D. Bassett Hound   E. Cocker Spaniel   F. Pit Bull NewChatParticipant: (B. Labrador Retriever) ~252

HostBOT: What is your favorite love song? ~255
A. LoveSongTitleA   B. LoveSongTitleB   C. LoveSongTitleC
D. LoveSongTitleD   E. LoveSongTitleE NewChatParticipant: (E. LoveSongTitleE) ~257

HostBOT: (Just one more question.) If you were stranded on a desert island, would what you bring with you? ~260
A. My personal music player   B. My satellite radio receiver   C. My journal
D. My soccer ball   E. My favorite novel   F. My portable e-mail message receiver

261

NewChatParticipant: (E. My favorite novel) ~262

HostBOT: (Now let's go meet some people) ~265

Private Party Seekers — 1505

Join This List — 1510
Join the pool of people seeking private parties. Add Me!

See Other Partiers — 1520
Search by one or more Of the following criteria:
☐ "dog breed"
[Poodle ▼]
☐ "Love Song"
[Poodle ▼]
☐ Private Party Status
[ ▼]
☐ Info Sheet Search
[Enter text]
[ Search ]

Part Account — 1530
- Balance: $20 remaining
- Buy More
- View Past Scoreboards
- Help 1. dragnet75
Currently in room "ABC": Go there now
Love Song: "Can You Feel the Love Tonight"
Interests: running, golf, reality TV
Gender: Female
View full Info Sheet
If invitation accepted: Will go Dutch Treat — 1505A 2. EyesHaveIt75
Currently in room "BeezKneez": Go there now
Love Song: "Can You Feel the Love Tonight"
Interests: running, golf, reality TV
Gender: Female
View full Info Sheet
Please Treat me to a Private Party — 1505B 3. 8isEnuff
Currently in room "off the Hook": Go there now
Love Song: "Can You Feel the Love Tonight"
Interests: running, golf, reality TV
Gender: Female
View full Info Sheet
Please Treat me to a Private Party 4. BuySellBuySell
Currently in room "fun for all": Go there now
Love Song: "Can You Feel the Love Tonight"
Interests: running, golf, reality TV
Gender: Female
View full Info Sheet
Please Treat me to a Private Party
-See more

Timer: 04:43 remaining in this conversation

1710

ChettheChatman: OK, for both of you:
Which dessert is mostly you:
1. Death by Chocolate cake
2. Chocolate Chip Cookies
3. Strawberry Shortcake
4. Cheesecake
5. Banana Splits Dgirl18985: Banana Splits JuanEBRAVO: Cheesecake ChettheChatman: JuanEBravo, if a cashier gives you to much change, what do you do?

JuanEBravo: I keep it.

Type here

| Pass | Bail Out! | Challenge |

- Ice Breaker Balance: $20
- Feedback: Tell Us

1730

 Side Banter With Chet

ChettheChatman: Dgirl1985 If you have any questions while playing, ask me here, where we can have a side conversation.

Type here

Current Icebreaker: Dgirl1985

 

Interests: running, golf, reality TV
Cheesiest High School love song: "Can You Feel the Love Tonight?"
See Dgirl1985's icebreaker info
Rate This Conversation:
Click stars to rate
★★★★☆

 Dgirls1985 is listening to The Clash.
Listen with her

--Go to Private Part Lineup.
--People Seeking Private Parties

USING AUTOMATED AGENTS TO FACILITATE CHAT COMMUNICATIONS

CROSS REFERENCE TO RELATED APPLICATIONS

This application claims the benefit of U.S. Provisional Application No. 60/668,971, filed Apr. 7, 2005, and titled LEVERAGING AUTOMATED AGENTS TO FACILITATE CHAT, which is incorporated by reference in its entirety.

TECHNICAL FIELD

This description relates to chat communications using an instant messaging system.

BACKGROUND

On-line services may provide users with the ability to send and receive instant messages. Instant messages may be exchanged in a private or public on-line conversation between two or more people who have access to an instant messaging service and who have installed communications software necessary to access and use the instant messaging service. A participant list that includes the communications identities with which a user exchanges instant messages may be displayed for a user and may be used to establish instant messaging sessions with those other identities. The participant list may indicate whether each identity associated with the participant list is on-line.

On-line services also may provide users with the ability to participate in a chat session with other users. A chat session also may be referred to as a chat room or a channel. In one example, instant messages may be exchanged in an on-line conversation between two or more people who have access to an instant messaging service and who have installed communications software necessary to access and use the instant messaging service.

Instant messages also may be exchanged between a person who has access to an instant messaging service with the requisite communications software and a program that is capable of automatically receiving and responding to instant messages without user intervention. Such a program may be referred to as an instant message robot, a BOT, or an automated agent. For example, an instant messaging robot may receive an instant message, identify an appropriate response to the instant message, and send the response automatically. Instant messaging robots may be used to automatically perform tasks that once required a human to perform, such as providing customer service.

DESCRIPTION OF DRAWINGS

FIGS. 2A-2C, 3, 6 and 7 are illustrations of example interfaces presented to a chat participant during a chat session facilitated by an instant messaging robot.

FIGS. 11-19 are illustrations of example interfaces in an implementation of a chat application that uses an instant messaging robot to facilitate chat communications.

Like reference symbols in the various drawings indicate like elements.

DETAILED DESCRIPTION

Figure 1:
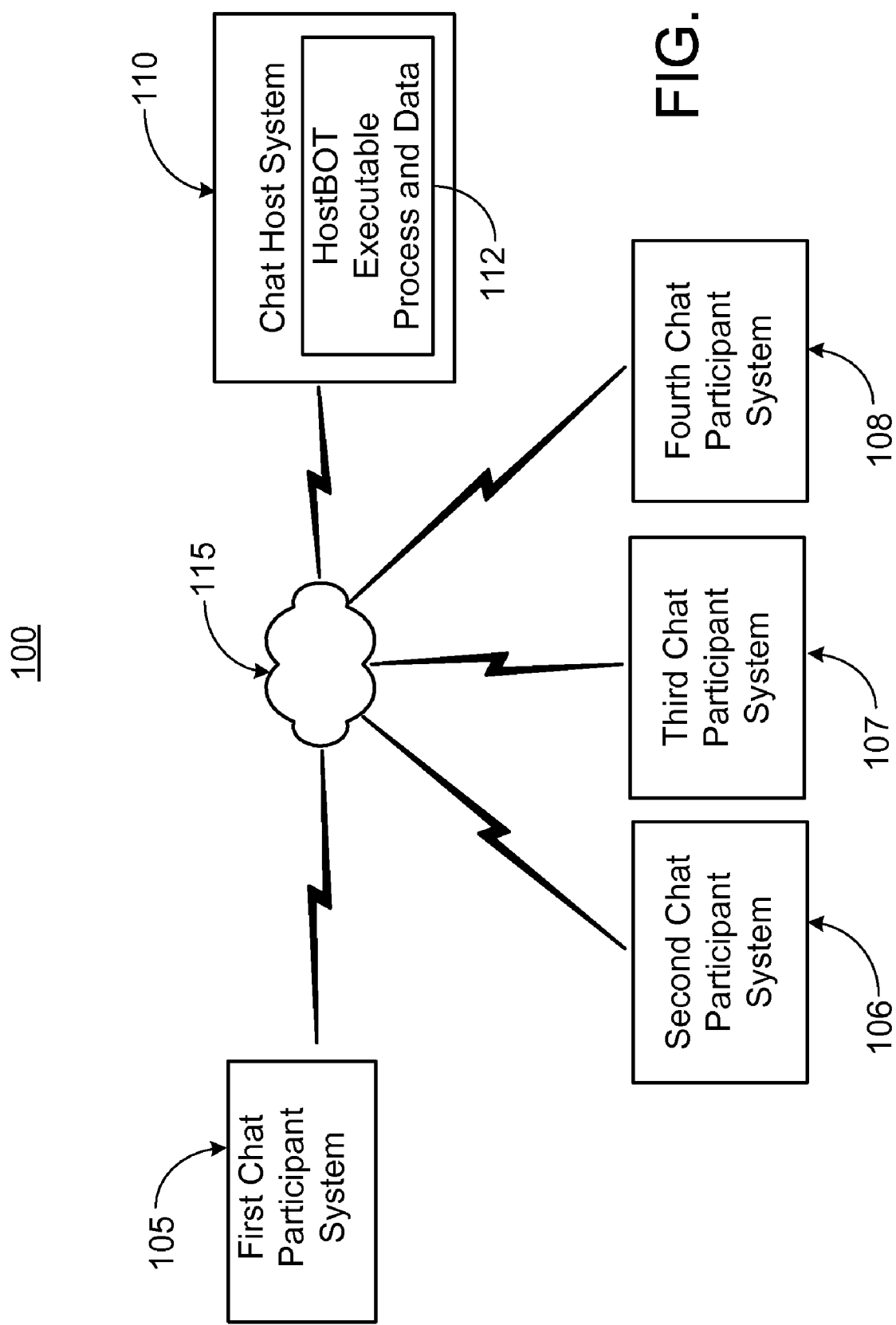
FIGS. 1 and 10 are block diagrams of communications systems capable of using an instant messaging robot to facilitate chat communications.

Techniques are described for leveraging or using a BOT to facilitate chat. A BOT may be used to introduce a chat participant to other chat participants. A BOT also may be used to monitor and chaperone conversations in the chat session.

More particularly, a BOT may be used to facilitate introduction of a chat participant to a small group or subset of other chat participants in a chat room. To do so, for example, a BOT may present a chat participant who desires to be introduced to a small group of chat participants in a chat room with a series of multiple-choice questions, identify a subset of chat participants based on responses to the multiple-choice questions, and provide introductions among the chat participants in the subset to facilitate conversation therebetween. The introductions provided by the BOT may indicate areas of mutual interest among chat participants in the subset, similar responses to one or more multiple-choice questions, and/or diverse responses to one or more multiple-choice questions.

In one example, before a chat participant enters a chat room or shortly thereafter, a BOT asks the chat participant multiple choice questions, such as questions that are whimsical, fun and easy to answer. One example of such a question is asking a chat participant to identify one of several dog breeds to which the chat participant believes himself or herself to be the most similar. Based on the chat participant's answer to one or more of the multiple choice questions, the BOT introduces the chat participant to a small group or subset of other chat participants, which may expedite, ease or otherwise help the chat participant to begin interacting with other chat participants in the small group or subset (i.e., help the chat participant to "break the ice" with the other chat participants). For convenience, the small group or subset of the chat participants may be referred to as an icebreaker group. The multiple choice questions may change on a nightly (or other periodic or predetermined) basis to help keep the chat room a fresh, interesting and entertaining experience. Additionally or alternatively, one or more open-ended questions also may be used to facilitate identifying a subset of chat participants in the chat room or to stimulate conversation between the chat participants in the icebreaker group. A chat participant may be able to see or otherwise perceive responses to some or all of the multiple-choice or open-ended questions that have been made by other chat participants with whom the chat participant is chatting. Exposure to some or all of a chat participant's responses may be based, perhaps, on a premium fee, making a predetermined number of visits or spending a predetermined length of time in the chat room, or another basis (such as, for example, being willing to expose the chat participant's own responses to other chat participants).

The techniques may help to address the problem that some chat participants may feel overwhelmed upon first entering a chat room and have difficulty starting to chat with chat participants who are already in the chat room. This may be particularly true when there are a large number of chat participants in a chat room, though this also may be true even when there are only a small number of chat participants in a chat room. It may be useful to use a BOT (or other automated mechanism) to identify a small group or subset of chat participants with whom a chat participant may be interested in chatting and introducing a chat participant to the identified small group or subset of chat participants or otherwise help the chat participant to begin interacting with the small group or subset of chat participants.

In another general aspect, a BOT may be used to monitor conversation among chat participants in a chat room. For example, a BOT may monitor conversation in an icebreaker group and, when a pause of a predetermined length is detected, the BOT may interject a question or comment to help stimulate additional conversation between the chat participants in the icebreaker group.

Additionally or alternatively, a BOT may chaperone the conversation in a chat room and intervene to the extent that the chat participant feels uncomfortable, which may help to provide a safe environment in which to chat. In one example, upon detection of an inappropriate remark by a first chat participant directed toward a second chat participant, a BOT may query whether the second chat participant is uncomfortable and only take action when the second chat participant is uncomfortable with the remark. Examples of actions that the BOT may take in response to an indication that the remark is unwelcome by the second chat participant include (but are not limited to): privately or publicly reprimanding or reminding the first chat participant not to make such remarks, identifying a different icebreaker group to which the second chat participant is to be introduced and removing the second chat participant from the first icebreaker group; identifying a different icebreaker group to which the first chat participant is to be introduced and removing the first chat participant from the first icebreaker group; and ejecting or otherwise removing the first chat participant from the chat room.

In a more particular example of using a BOT to monitor or chaperone a conversation, when a BOT detects that a first chat participant has made what may be an inappropriate sexual or risqué remark to a second chat participant, the BOT queries the second chat participant, "Does that make you uncomfortable?" and permits the conversation to continue otherwise uninterrupted unless or until the second chat participant indicates the remark was unwelcome. On the other hand, once the second chat participant indicates that the remark was unwelcome, the BOT may take action to protect the second chat participant from further unwelcome remarks, as described above.

The BOT may identify inappropriate remarks, for example, based on keyword matching. In some implementations, the BOT may learn over time the types of remarks that may make a particular chat participant or chat participants having a particular demographic or demographics uncomfortable. For example, remarks that a particular chat participant indicated were unwelcome and/or not unwelcome may be stored and used to more accurately predict or otherwise gauge the types of remarks that make that particular chat participant uncomfortable. Additionally or alternatively, a chat participant may complete an optional or mandatory questionnaire regarding the types of remarks that are unwelcome and/or welcome.

The monitoring techniques also may help chat participants who feel exposed and vulnerable in a chat room. The techniques may encourage chat participants who otherwise may not participate in a chat room because of fear of unwelcome remarks, for example, to participate in the chat room.

FIG. 1 illustrates a communications system 100 that supports a chat service. The system 100 includes a first chat participant system 105 communicating with one or more other chat participant systems 106, 107, 108 and a chat host system 110 through a communication link 115. The chat host system 110 is capable of using a BOT to facilitate chat communications. The chat host system 110 includes data and code segments 112 for using a BOT to facilitate chat communications. Typically, chat communications involve an instantaneous or nearly instantaneous communication between two or more users, where each user is able to transmit, receive and display communicated information. Additionally, chat communications may involve the display and perception of on-line presence information regarding other users present in the chat room. However, chat communications may occur in the absence of on-line presence information. The chat communications may be machine-to-machine communications that occur without intervention by or communication through a chat server after a communication session is established or authentication is performed. Examples of chat communications includes those provided by AOL (America On-line), Yahoo, and MSN, among others.

Chat system users may be distributed geographically and may communicate with the chat host system 110 using chat participant systems, such as second chat participant system 106, third chat participant system 107, or fourth chat participant system 108. Second chat participant system 106 runs chat client software that communicates with corresponding chat host software on chat host system 110, by way of a browser or otherwise. Chat host system 110 coordinates chat sessions by receiving the textual, or other, input sent from a first chat participant system 105 or a second chat participant system 106 and replicating that input to other systems such as the second chat participant system 106 or the first chat participant system 105, as appropriate.

The chat host system 110 may support chat services irrespective of a first chat participant's network or Internet access. Thus, the chat host system 110 may allow users to send and receive messages, regardless of whether they have access to any particular ISP. The chat host system 110 also may support associated services, such as administrative matters, advertising, directory services, chat, and interest groups related to the chat. The chat host system 110 has an architecture that enables the devices (e.g., servers) within the chat host system 110 to communicate with each other. To transfer data, the chat host system 110 employs one or more standard or exclusive chat protocols. The chat host system 110 includes data and code segments that, when executed, are operable to use a BOT to facilitate chat communications.

To access the chat host system 110 to begin a chat session in the implementation of FIG. 1, the first chat participant system 105 establishes a connection to the chat host system 110. Once a connection to the chat host system 110 has been established, the first chat participant system 105 may directly or indirectly transmit data to and access content from the chat host system 110. By accessing the chat host system, a first chat participant can use the chat client application to view which other users (e.g., a "people here list") are on-line in the chat room, and/or exchange messages with the other users in the chat room. The user also may be supplied with other capabilities, such as the ability to trade files such as pictures, invitations or documents, find other users with similar interests, get customized information (such as news and stock quotes), and search the Web. The second chat participant system 106 may be similarly manipulated to establish a contemporaneous connection with chat host system 110.

Once connectivity is established, a first chat participant who is using the first chat participant system 105 may view whether a second chat participant using the second chat participant system 106 is on-line, and typically may view whether the second chat participant is able to receive messages. If the second chat participant is on-line, the first chat participant may exchange messages with the second chat participant.

In one implementation, the messages sent between first chat participant system 105 and second chat participant system 106 are routed through chat host system 110. In another implementation, the messages sent between first chat participant system 105 and second chat participant system 106 are routed through a third party server (not shown), and, in some cases, are also routed through chat host system 110. In yet another implementation, the messages are sent directly between first chat participant system 105 and second chat participant system 106.

Figure 2A:
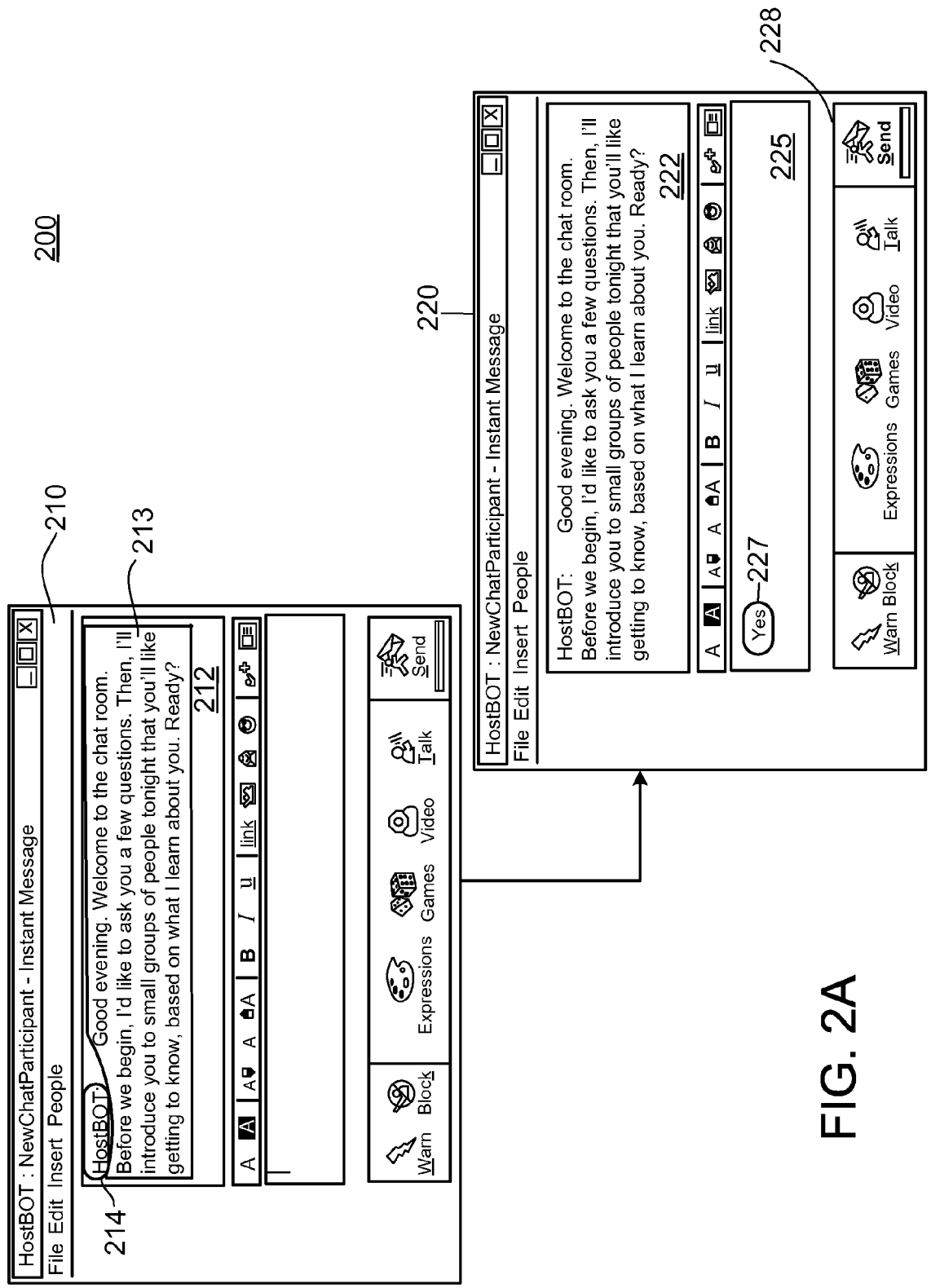
Figure 2B:
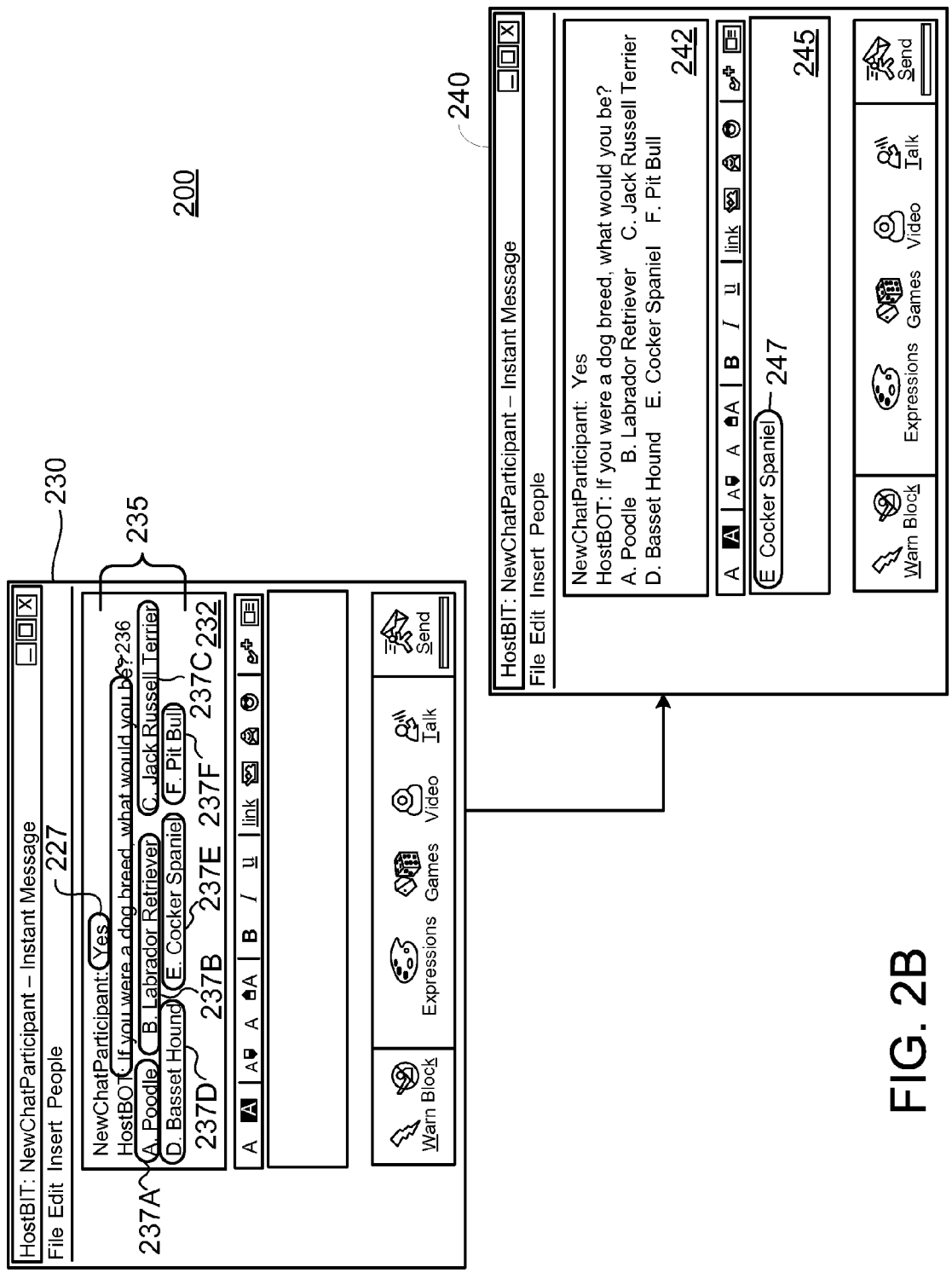

FIGS. 2A and 2B illustrates a series 200 of instant messaging (IM) interfaces 210-240 with which instant messages may be sent and received. As shown, the IM interfaces 210-240 are used to exchange communications with a BOT communications identity used to facilitate communications exchanged within a chat room. More particularly, the series 200 depicts communications exchanged with the BOT communications identity (i.e., HostBOT) with a communications identity of a natural person (i.e., NewChatParticipant) to elicit responses to questions to help identity a group or subset of chat participants (e.g., an icebreaker group) to whom NewChatParticipant is to be introduced. The series 200 of IM interfaces is displayed on an IM system used by NewChatParticipant to access the chat system.

The IM interface 210 includes a message history box 212 that lists the instant messages sent between the HostBOT and NewChatParticipant. The message history box 212 also may be referred to as a message transcript box 212. Each message is presented with an indication of a identifier (e.g., a screen name) by which the sender of the message is identified. Each message listed in the message history box also includes the text of the instant message sent by the sender. For example, the message history box 212 includes a message 213 sent by a BOT with a screen name "HostBOT" 214 to a communications identity with a screen name of "NewChatParticipant." In the example of IM interface 210, the HostBOT communications identity has sent the message 213 to NewChatParticipant to introduce the BOT to the NewChatParticipant that indicated an interest in entering a chat room hosted by the HostBOT communications identity. The IM interface 210 represents the interface presented to the NewChatParticipant when the message 213 sent by the HostBOT is received by the NewChatParticipant's chat system.

The IM interface 220 of the series 200 includes a message history box 222 and a message specification box 225 in which the NewChatParticipant may specify a message to be sent to the HostBOT. As shown in the example, the NewChatParticipant entered text 227 (i.e., "Yes") to be sent in a message in response to the HostBOT's welcome or introductory message. After a message has been specified in the message specification box 225, the message may be sent by selecting a send button 228. After the send button 228 has been selected, the text that has been entered in the message specification box 225 is sent to the recipient, the message specification box 225 is cleared, and the message is added to the message history box 222.

Referring also to FIG. 2B, an IM interface 230 depicts the text message 227 of the NewChatParticipant in a message history box 232. In response to the text message 227, the HostBOT sent a message 235 to the NewChatParticipant. The message 235 is a multiple-choice question that includes a text question 236 and selectable answers 237A-237F. The text question 236 also may be referred to as an elicitation question or a prompt. More particularly, in the example of message 235, the question 236 of "If you were a dog breed, what would you be?" is presented with six selectable answers of "A. Poodle" 237A, "B. Labrador Retriever" 237B, "C. Jack Russell Terrier" 237C, "D. Basset Hound" 237D, "E. Cocker Spaniel" 237E, and "F. Pit Bull" 237F.

As illustrated in IM interface 240, the NewChatParticipant has indicated a selection of "E. Cocker Spaniel" 237E as message text 247 to be sent to the HostBOT. The message 247 also may be referred to as a response or an answer. For illustrative purposes, the message text 247 shown in FIG. 2B includes the text of answer 237E. In some implementations, the chat participant may enter a character or characters used to identify a particular answer. For example, a chat participant may enter only "E" to indicate selection of answer 237E.

Referring also to FIG. 2C, a message history window 200C shows messages exchanged between the HostBOT and the NewChatParticipant, where the messages illustrate the presentation by the HostBOT of multiple-choice questions to elicit responses by the NewChatParticipant that are later used, in whole or in part, to identify an icebreaker group of chat participants to which the HostBOT introduces NewChatParticipant. In the example of message history window 200C, and as previously described with respect to FIGS. 2A and 2B, the HostBOT sent an initial welcome message 213 to the NewChatParticipant that may introduce the BOT communications identity and help orient the chat participant to the purpose and process of the interaction with the BOT shown in message history window 200C. The message history window 200C also includes serially asked multiple-choice questions 235, 250, 255 and 260 to which the NewChatParticipant responded by selecting one of the answers 247, 252, 257 and 262 presented in each of the multiple-choice question. The HostBOT also included a transition remark 261 that may help the HostBOT appear more humanlike. In addition, the HostBOT sent a message 265 to the NewChatParticipant that may help orient the chat participant to being introduced to other chat participants.

Figure 3:
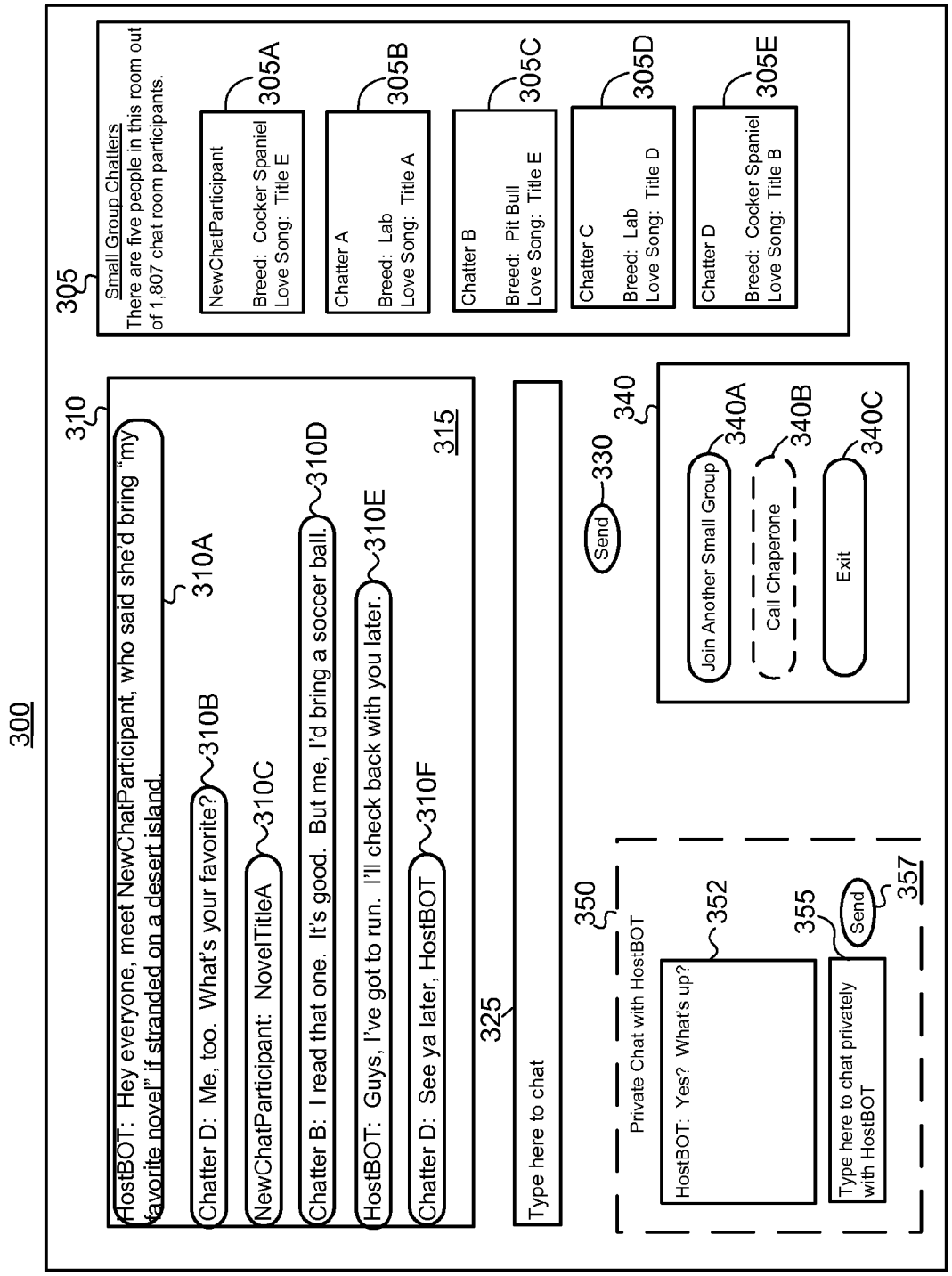

FIG. 3 illustrates one example of an interface 300 that may be presented to a chat participant of a chat service provider that provides a BOT for facilitating chat communications. Continuing the example described above, once the chat participant (i.e., NewChatParticipant) has answered the HostBOT's multiple choice questions, the chat participant joins an icebreaker group identified by the HostBOT (or another aspect of the chat system. The chat host system replicates messages sent by the chat participant to other chat participants who are members of the icebreaker group.

The interface 300 includes a icebreaker group participant list 305 that enables a first chat participant (here, the NewChatParticipant) of a chat service to, among other things, perceive the presence state of other chat participants that are members of the icebreaker group, and send chat messages to the chat participants on the chat participant list 305. As shown, there are five chat participants, including the NewChatParticipant 305A and four other chat participants 305B, 305C, 305D and 305E, who are members of the icebreaker group. In the example of the interface 300, each indication of a chat participant includes the screen name of the chat participant (e.g., NewChatParticipant, Chatter A, Chatter B, Chatter C and Chatter D), an indication of the dog breed selection identified by the chat participant in response to question 235, and an indication of the love song identified by the chat participant in response to question 255. As depicted, only answers to some of the questions presented by the BOT are presented. In some implementations, answers to other questions may be made perceivable based on a predetermined condition, such as registration in the chat room, payment of a premium fee, or compliance with privacy constraints set by the chat participant. As illustrated in this example, the BOT may identify a small group of chat participants based on similar answers to a question. Here, the NewChatParticipant 305A and Chatter D 305E both selected "Cocker Spaniel" in response to question 235, and NewChatParticipant 305A and Chatter B 305E both selected "Title E" in response to question 255. The BOT also may identify a small group of chat participants based on responses to a multiple questions with related subject matter. Here, for example, NewChatParticipant 305A responded to question 250 with the selection of "Labrador Retriever" as the dog breed with whom NewChatParticipant 305A would most want to play and Chatter A 305B and Chatter C 305D both selected "Labrador Retriever" in response to question 235.

The interface 300 includes a chat display area 310 to display the messages 310A, 310B, 310C, 310D, 310E and 310F of an active chat session 315 of the icebreaker group within a chat room. The conversation in the active chat session 315 normally appears the same for all participants in the icebreaker group of the chat room. A chat participant typically converses with other chat participants by typing a line of text in an edit box 325 and activating a send command, for example, by pressing the ENTER key of the keyboard of the chat participant's system or activating send control 330. In response, the entered text is displayed in the chat display area 310. The chat participants in the icebreaker group may now see the entered text. However, chat participants who are in the chat room and are not part of the icebreaker group cannot see the entered text.

As shown, the active chat session 315 includes the identity (e.g., screen name of the chat participant next to the text entered by that chat participant. For example, message 310B includes the identity of chat participant 305E (i.e., "Chatter D"), and message 310D includes the identity of the chat participant 305C (i.e, "Chatter B"). In addition, messages 310A and 310E include the identity of the BOT (i.e., "HostBOT") to identify the BOT as the sender of those messages.

The interface 300 also includes a control area 340 that has a control 340A to "Join Another Small Group," which, when activated, causes the BOT to determine another small group to which the chat participant who activated the control is to be introduced. In some implementations, the BOT may present a participant list of another icebreaker group and, in response to confirmation from the chat participant, the BOT may transition the chat participant to the other icebreaker group.

The control area 340 also may include an optional control 340B to "Call Chaperone," which, when activated, alerts the BOT that some interaction is requested with respect to the icebreaker group. In some implementations, a BOT may send a private instant message to the chat participant. For example, the BOT may send a "What's up?" message or a "You rang?" message. As illustrated in the example of interface 300, a side (or otherwise private) conversation between the chat participant (i.e., "NewChatParticipant") and the BOT (i.e., "HostBOT") may be conducted in optional side-conversation area 350. The side-conversation area 350 includes a private message history window 352 to show messages privately exchanged between the BOT and the chat participant. The side-conversation area 350 also includes an edit box 355 and a send control 357 operable to send the BOT a private message not perceivable by other chat participants—that is, a message that is not displayed in the active chat session 310.

Additionally or alternatively, a BOT may send a message to the active chat session 315 that may not necessarily provide an indication that a chat participant called the BOT. For example, the BOT may send a message, "Just checking in. Everything okay, here?" to give the chat participant who called the BOT an opportunity to ask a question or otherwise respond to the BOT. The control area 340 also includes an exit control 340C that removes the interface 300 from the chat participant's display and enables the chat participant to exit the icebreaker group.

As illustrated in the example of the active chat session 315, the HostBOT sent a text message 310A to introduce the NewChatParticipant to the other chat participants in the icebreaker group, and, in response, some of the other chat participants directed comments to the NewChatParticipant, such as messages 310B and 310D. As the chat conversation proceeds, the HostBOT sends a message 310E to distance itself from directly participating in the icebreaker group, and a chat participant responds with message 310F.

Figure 4:
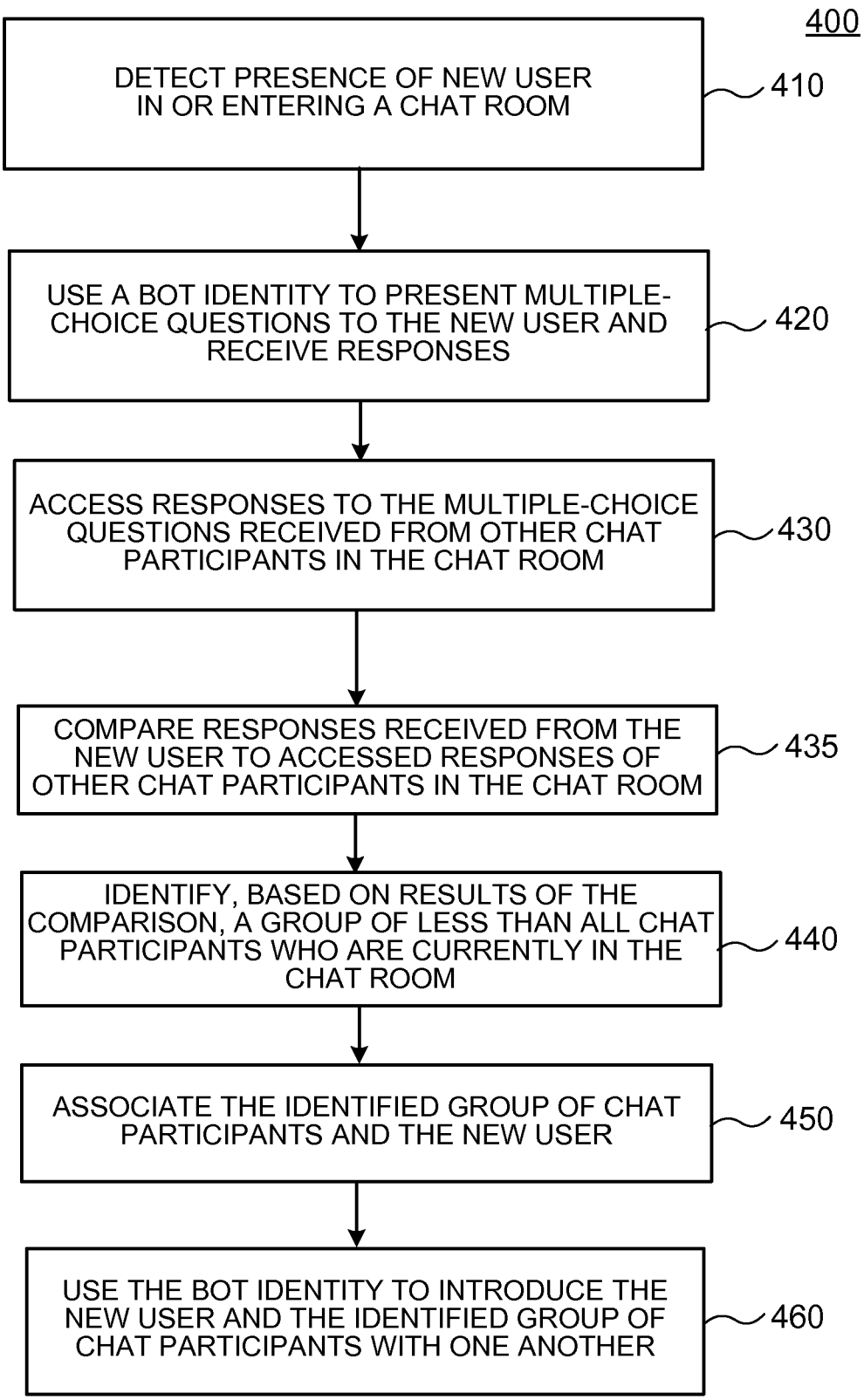
FIG. 4 is a flow chart of a process for using an instant messaging robot to facilitate introduction of a chat participant to a small group of chat participants in a chat room.

FIG. 4 shows a process 400 for using a BOT to facilitate introduction of a chat participant to a small group of chat participants (e.g., an icebreaker group). The process 400 may be performed, for example, by a processor on an instant messaging or chat service provider system, a processor on a client system running an instant messaging or chat application, or a processor on a client system executing an on-line dating application.

The process 400 may be programmatically initiated in response to an indication that a chat participant is in the process of, desires to, or has recently entered a BOT-facilitated chat room. In some implementations, the process 400 may be manually initiated by a user who desires a BOT-facilitated interaction experience. For convenience in describing the example of process 400, the chat participant interacting with the user interface is referred to as the user, and communications identities who are natural persons and are in the active chat session of the icebreaker group are referred to as chat participants.

The processor detects the presence of a user who desires to enter, is in the process of entering, or has recently entered a BOT-facilitated chat room (step 410). The processor may, for example, receive an indication of a user who activated a control (e.g., a menu option or control, a button or a link) to join a BOT-facilitated chat session. This may be accomplished, for example, when the processor receives a user identifier (such as a screen name) that corresponds to the user who initiated the display of the user interface and provides user-input for the process 400. For example, the processor may receive the screen name of the user, where the screen name was identified through a user authentication process performed to grant access to the computer network or to grant access to particular functions available through the computer network (such as an instant messaging, chat or dating application or service). In another example, the user may directly key in or otherwise enter a user identifier using an input device of a computer system.

The processor uses a BOT communications identity to present multiple-choice questions to the user and receive, from the user, responses to the multiple-choice questions (step 420). To do so, for example, the BOT may exchange a series of IM communications with the user, as described previously with respect to FIGS. 2A-3. In another example, the BOT may present an interactive, electronic form having multiple-choice questions and receive responses submitted by the chat participant to some or all of the multiple-choice questions.

The processor accesses responses to the same or different multiple-choice questions received from other chat participants who are in the chat room (step 430). The responses may be accessed from persistent or transient computer-readable storage. In some implementations, the accessed responses are responses to the same multiple-choice questions presented to the user, though this need not necessarily be so. For example, some or all of the accessed responses may be to different multiple-choice questions. In some implementations, the accessed responses may be responses submitted by chat participants to multiple-choice questions presented in a previous chat session.

The processor compares responses received from the user to the accessed responses of other chat participants who are in the chat room (step 435) and identifies, based on results of the comparison, a group of less than all chat participants who are in the chat room (step 440). The identified group may be referred to as a small group, a subset, or an icebreaker group. Typically, the processor identifies a small group of chat participants (e.g., 4-8 chat participants) that enables ample opportunity for each chat participant to interact. In many instances, the number of chat participants in the icebreaker group may be substantially less than the number of chat participants who are in the chat room. The processor may identify the chat participants to be part of a particular icebreaker group based on similar or the same answers to a question, dissimilar answers to a question, or answers to related questions. In some implementations, answers to open-ended questions or demographic data about the user may be used.

For example, responses to questions provided by a chat participant may be converted to a representative code that is stored (e.g., a code that represents a chat participant's response to one or more questions is stored). The representative code or codes for the chat participant are compared to a representative code or codes associated with other chat participants to identify chat participants for a particular icebreaker group.

The processor associates the identified chat participants who are to be members of the icebreaker group, including the user (step 450). For example, the chat participants may be associated through the use of a private chat room, associating a group indicator or identifier (e.g., an icebreaker group identifier) to each chat participant who is a member of the particular icebreaker group, or through use of alternative data management or programming techniques.

The processor then uses the BOT communications identity to introduce the user to the other chat participants in the identified icebreaker group (step 460). A user may be introduced to an icebreaker group that includes chat participants presently chatting, such as is illustrated in the example of interface 300 of FIG. 3. Additionally or alternatively, an icebreaker group of chat participants may be identified such that the chat participants have not yet begun chatting with one another. In such a case, the BOT may introduce multiple chat participants to one another to help the group of chat participants begin interacting with one another in the newly formed icebreaker group.

In some implementations, the responses to some or all of the questions may be persistently stored in a user profile for the chat participant that is searchable by other chat participants in the chat session and/or in a future chat session. Additionally or alternatively, processing logic may be applied to responses by a chat participant to identify inconsistent responses, particularly across multiple chat sessions, that may indicate untruthful responses. Such processing logic may be referred to as a consistency filter or a honesty filter. For example, a chat participant may indicate in one chat session that the chat participant is a surgeon and is forty years old and the same chat participant in another chat session may identify himself as a professional baseball player who is twenty-eight years old. The processor may identify such inconsistencies and alert the chat participant and/or other chat participants of such inconsistencies within permitted privacy constraints. In some implementations, a chat participant may need to agree that consistency logic is to be applied to the chat participant's responses before such inconsistencies are presented to other chat participants. Additionally or alternatively, a chat participants willingness (or unwillingness) may be made perceivable to other chat participants during a chat session. For example, an indicator that a chat participant has agreed to be subject to a consistency or honesty filter may be displayed in association with a chat participant's screen name. This may help to encourage honest responses by chat participants.

Figure 5:
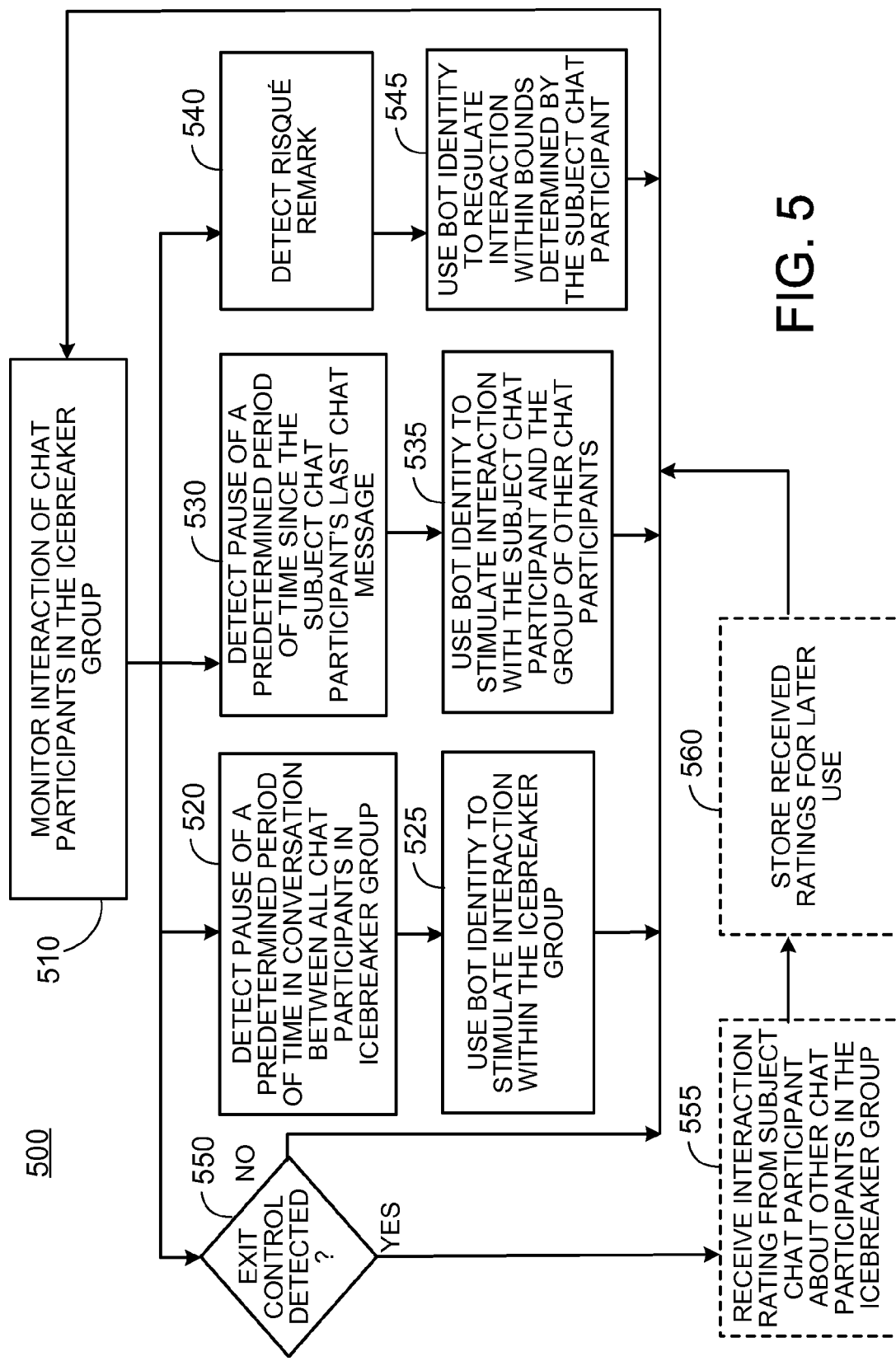
FIG. 5 is a flow chart of a process for using an instant messaging robot to monitor interaction of chat participants in a chat room.

FIG. 5 shows a process 500 for using a BOT to monitor interaction of chat participants in an icebreaker group. The process 500 may be performed, for example, by a processor on an instant messaging or chat service provider system, a processor on a client system running an instant messaging or chat application, or a processor on a client system executing an on-line dating application. For convenience in describing the example of process 500, one of the chat participants is referred to as the subject chat participant, whereas other communications identities who are natural persons and are in the chat session are referred to as the other chat participants. There can be multiple subject chat participants in an active chat session of an icebreaker group within a chat room during a period of time. Typically, the process 500 is performed during a time period with each chat participant in the icebreaker group being designated as a subject chat participant.

The processor monitors the interaction between chat participants in the icebreaker group (step 510). When the processor detects a pause of a predetermined period of time in a conversation between all chat participants in the icebreaker group (step 520), the processor uses the BOT communications identity to stimulate interaction within the icebreaker group (step 525). For example, the processor may detect such a pause when no messages have been sent in the active chat session of the icebreaker group within a predetermined period of time, or the number of messages sent during a predetermined period of time is less than a threshold number of messages. To stimulate interaction, the BOT may ask a question or make a comment to the icebreaker group. In one example, the BOT may privately ask (e.g., by sending a private instant message) one of more of the chat participants another multiple-choice or open-ended question and send a message to the active chat session of the icebreaker group based on the response or responses to the question. In another example, the BOT may comment to the icebreaker group, where the comment is based on a response to a multiple-choice or an open-ended question previously provided by a chat participant. In yet another example, the BOT may comment on subject that is unrelated to any multiple-choice questions asked. For example, the BOT may make a remark concerning a recent or future sporting event, cultural event, current event, or a sports, entertainment or political personality.

When the processor detects a pause of a predetermined period of time since the subject chat participant's last chat message (step 530), the processor uses the BOT communications identity to stimulate interaction between the subject chat participant and the other chat participants in the icebreaker group (step 535). For example, the processor may detect such a pause when no messages (or fewer than a threshold number of messages) have been sent in the active chat session by the subject chat participant within a predetermined period of time. To facilitate interaction involving the subject chat participant, for example, the BOT may ask a question or make a comment to the active chat session of the icebreaker group that refers to the subject chat participant or includes subject matter related to the subject chat participant.

When the processor detects foul, sexual innuendo, risqué or otherwise potentially inappropriate or bothersome language (collectively, "risqué remark") (step 540), the processor uses the BOT communications identity to regulate interaction within bounds determined by the subject chat participant (step 545). For example, the processor may use keyword matching or other types of filtering or identification techniques to detect a risqué remark, whether or not the risqué remark is directed at the subject chat participant. To regulate interaction within bounds determined by the subject chat participant, the BOT may send a private IM to the subject chat participant to ask whether the risqué remark is offensive, bothersome or otherwise unwelcome (collectively, "unwelcome") and take appropriate action in response to the subject chat participant's answer. For example, if the subject chat participant indicates that the risqué remark is not bothersome, the BOT may take no action. If the subject chat participant indicates, however, that the risqué remark is unwelcome, the BOT may take one of several actions, including, for example, publicly or privately reprimanding or otherwise notifying the chat participant who made the risqué remark that the remark is not permitted or ejecting the chat participant who sent the risqué remark from the icebreaker group or, perhaps, the chat room.

Figure 6:
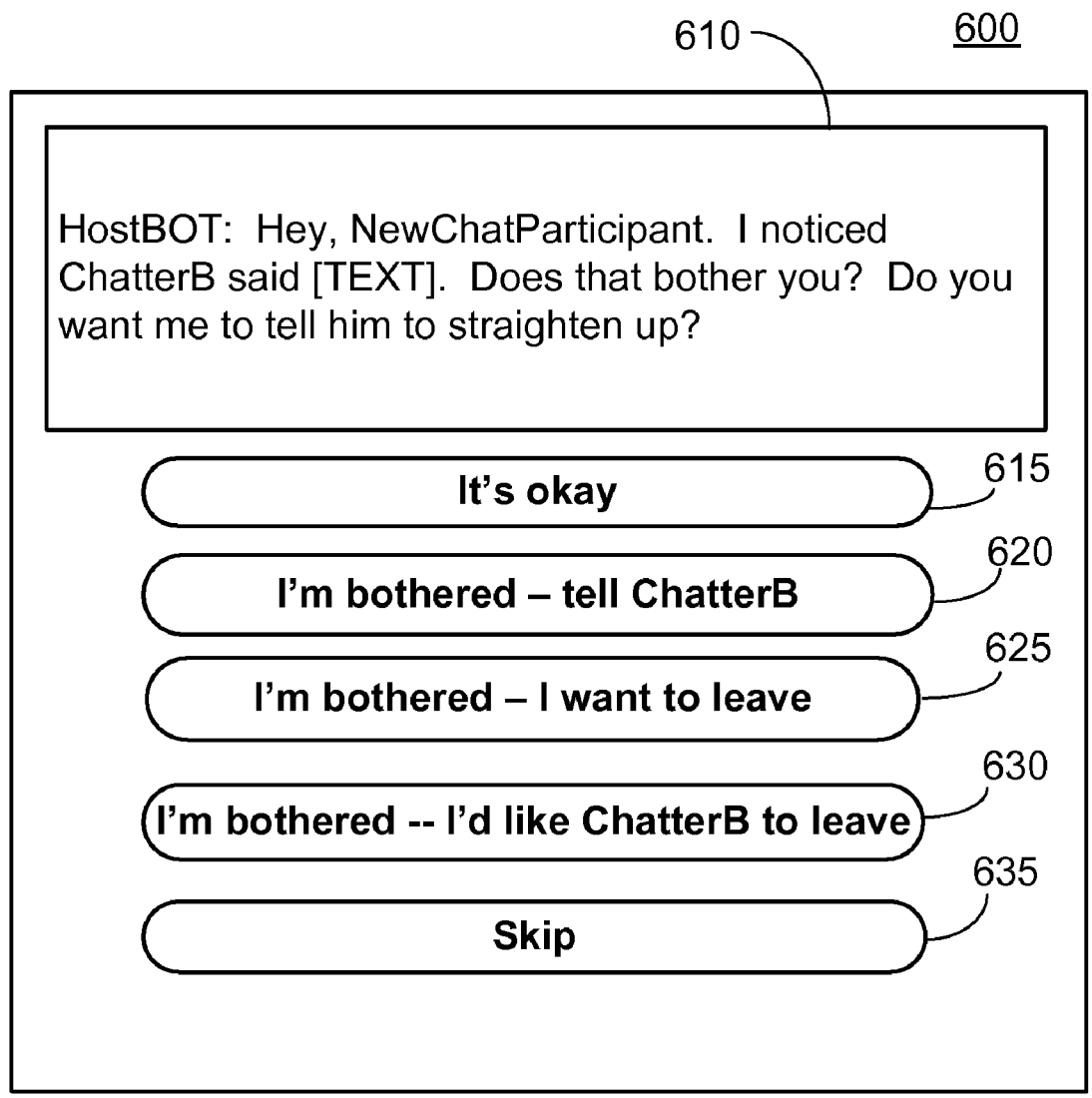

FIG. 6 illustrates an example interface 600 for obtaining a reaction by the subject chat participant to a risqué remark. The interface 600 includes a message area 610 that includes a private message to the subject chat participant from the HostBOT and controls 615-635 that provide potential responses from which the subject chat participant may select. The controls 615-635 also provide direction to the BOT as to what type of action to take based on the subject chat participant's response to the risqué remark. In particular, control 615 indicates that the subject chat participant is not bothered by the risqué remark, and, as a result, the BOT takes no action with regard to the risqué remark or the chat participant who made the risqué remark. Controls 620, 625 and 630 each indicate that subject chat participant is bothered by the remark and direct the BOT to take various action. Control 620 directs the BOT to inform the chat participant who made the risqué remark that such remarks are unwelcome, whereas control 624 directs the BOT to introduce the subject chat participant to a different icebreaker group. Control 630 directs the BOT to eject the chat participant who made the risqué remark from the icebreaker group (and perhaps, the chat room). Control 635 enables the subject chat participant to indicate that the subject chat participant prefers not to provide a response to the BOT's message 610.

Referring again to FIG. 5, in response to detection of activation of an exit control by the subject chat participant (step 550), the processor may present and receive interaction ratings from the subject chat participant about other chat participants in the group (step 555) and store the received interaction ratings for later use, such as in identifying icebreaker groups for the subject chat participant (step 560).

Figure 7:
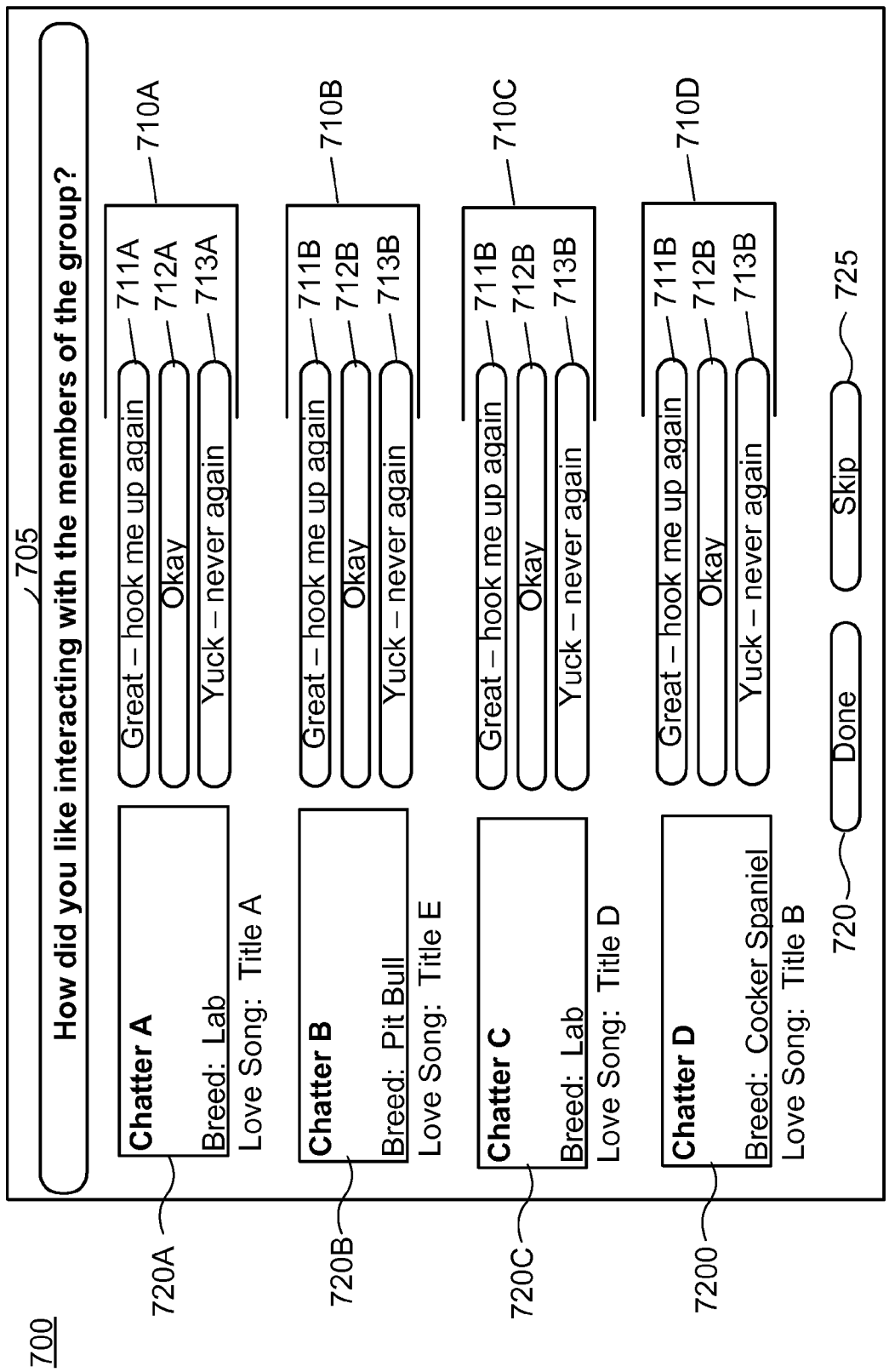

FIG. 7 illustrates an example interface 700 for presenting and receiving ratings from a chat participant about interaction with other chat participant in the icebreaker group. The interface 700 may be presented when a chat participant exits an icebreaker group and/or may be presented during the chat session with the icebreaker group to obtain subjective information about the interaction to help facilitate conversations in the chat session within the icebreaker group.

The interface 700 includes an elicitation question 705 and a series of rating controls 710A-710D that are associated with chat participants 720A-720D. In this example, each of the rating controls 710A-710D includes the same options: an option 711A, 711B, 711C or 711D indicating that the subject chat participant was pleased with the chat participant and would like to chat again, an option 712A, 712B, 712C or 712D that the subject chat participant found chatting with the chat participant a neutral experience, and an option 713A, 713B, 713C or 713D indicating that the subject chat participant would not like to chat with chat participant again.

The interface 700 also includes a done control 725 that removes the interface 700 from the subject chat participant's display and causes the responses to be stored for later use. The interface 700 further includes a skip control 725 that causes the interface 700 to be removed from the subject chat participant's display without storing responses.

The interaction ratings may be stored in computer readable medium in association with the screen name of the chat participant who made the subjective rating for later use in identifying chat participants to be members of an icebreaker group within a chat room. For example, a processor identifying members of a icebreaker group may access stored interaction ratings made by a chat participant to help determine membership in the icebreaker group. In one example, a first chat participant may not be placed in the same icebreaker group with a second chat participant whom the first chat participant indicated a negative prior interaction. In another example, the interactive ratings may be used to further refine the process for determining membership in an icebreaker group. For example, a pattern may be detected of positive (or negative) interaction responses and particular responses to multiple-choice questions, and the pattern may be applied to the composition of icebreaker groups. Such a process may be useful even when the multiple-choice questions change on a nightly basis, particularly when there are sufficient numbers of chat participants who provide subjective ratings. For example, responses to questions presented earlier in the chat session may be used to identify icebreaker groups later in the chat session.

Some implementations may use other categories or numerical ratings. Additionally or alternatively, interactive ratings may include multiple questions to be answered about the interactive experience with a chat participant.

Figure 8:
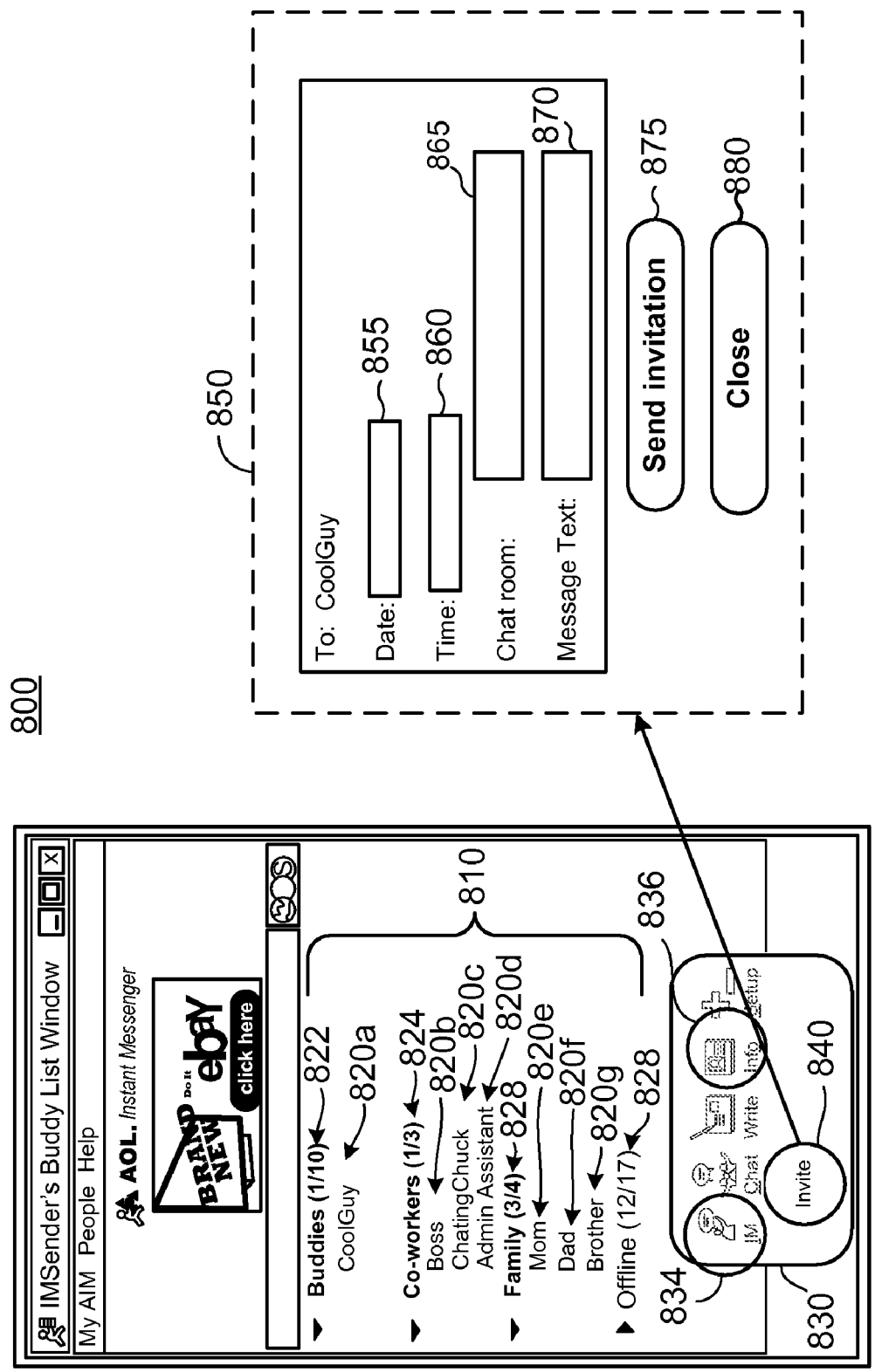
FIG. 8 is an illustration of an example interface for showing a participant list that may be used to send an invitation to meet in a chat room.

Referring to FIG. 8, an interface 800 displays a participant list for an instant messaging identity (e.g., an instant message sender) such that an instant message sender may send an invitation to meet on-line in a chat room at a later time.

The interface 800 includes an instant message sender-selected list 810 of potential instant messaging recipients 820a-820g. The interface 800 may be referred to as an instant message participant list window 800, an instant message participant list interface 800, or, more simply, a participant list window 800 or a participant list interface 800, and the list 810 may be referred to as a participant list 810. In some implementations, the participant list also may be referred to as a buddy list, a contact list or a friends list. Thus, buddies typically are contacts who are known to the potential instant message sender (here, IMSender). A buddy is identified by a screen name or other type of identity identifier, such as an account name, a user name, a user identity, or an alias of an identity identifier. In particular, the user IMSender is an instant message sender using the participant list interface 800. The participant list interface 800 is rendered on the display of a computing device or a communication device on which an instant messaging client program is executed.

In the participant list 810, the representations 820a-820g include text identifying the screen names of the buddies included in participant list 810. For convenience, each of the representations 820a-820g may be referred to as a screen name 820a-820g. In some implementations, one or more of the representations 820a-820g may be an alias of a screen name rather than a screen name itself. The representations 820a-820g may provide connectivity information to the instant message sender about the buddy, such as whether the buddy is on-line, how long the buddy has been on-line, whether the buddy is away from the client system executing the instant messaging client application, or whether the buddy is available through a mobile device.

Buddies may be grouped by an instant message sender into one or more user-defined or pre-selected groupings ("groups"). As shown, the instant message participant list window 800 has three groups, Buddies 822, Co-Workers 824, and Family 826. CoolGuy 820a belongs to the Buddies group 822, and ChattingChuck 820c belongs to the Co-Workers group 824. When a buddy's instant message client program is able to receive communications, the representation of the buddy in the participant list is displayed under the name or representation of the buddy group to which the buddy belongs. As shown, at least potential instant messaging recipients 820a-820g are on-line. In contrast, when a buddy's instant message client program is not able to receive communications, the representation of the buddy in the participant list may not be displayed under the group with which it is associated, but it may instead be displayed with representations of buddies from other groups under the heading Offline 828, or it may otherwise be visually distinguished from other buddies who then have available/present instant message client programs. All buddies included in the participant list 810 that are displayed in the messaging mode are displayed either under one of the groups 822, 824, or 826, or under the heading Offline 828.

When an on-line screen name from the participant list 810 has been selected, activating an instant messaging control 834 displays an interface for communicating with the account corresponding to the selected screen name. Activating the instant messaging control 834 without selecting an on-line screen name in the participant list 810 causes the display of an interface for communicating and allows a user to identify a instant messaging user that is not on the user's participant list.

An info control 836 displays contact information related to a screen name selected on the participant list 810 when contact information is available about the buddy. Such information may include, for example, a mobile telephone number, a work telephone number, and a home telephone number. In some implementations, information other than contact information may be displayed, such as, for example, name, geographic location, interests and hobbies, and occupation of the buddy. The contact information may be entered by identity (i.e., buddy) and, optionally, the identity may control whether some or all such information is displayed to other users. Additionally or alternatively, the contact information for the buddy may be entered by the user (i.e., the IM Sender).

The interface 800 also includes an invitation control 840 that enables sending an electronic invitation to meet on-line in a chat room at a later time. In this example, CoolGuy 820a is selected on the participant list 810 when the invitation control 840 is activated and, as such, the invitation entry portion 850 that is displayed upon activation of the invitation control 840 indicates that the invitation is to be sent to CoolGuy. The invitation entry portion 850 includes a date field 855 and a time field 860 operable to receive user input to identify a date and time when the sender is to meet the invitee on-line. The invitation entry portion 850 also includes a field 865 operable to receive a chat room identifier where the invitee is to meet the sender of the invitation. The invitation entry portion 850 optionally includes a message text portion 870 that may be used to provide additional information to be provided in the invitation The invitation entry portion 850 also includes a control 875 to remove the invitation entry portion 850 from the sender's display and electronically send the invitation to the identified recipient (here, to CoolGuy). The invitation entry portion 850 also includes a control 880 to remove the invitation entry portion 850 from the sender's display without sending the invitation.

Figure 9:
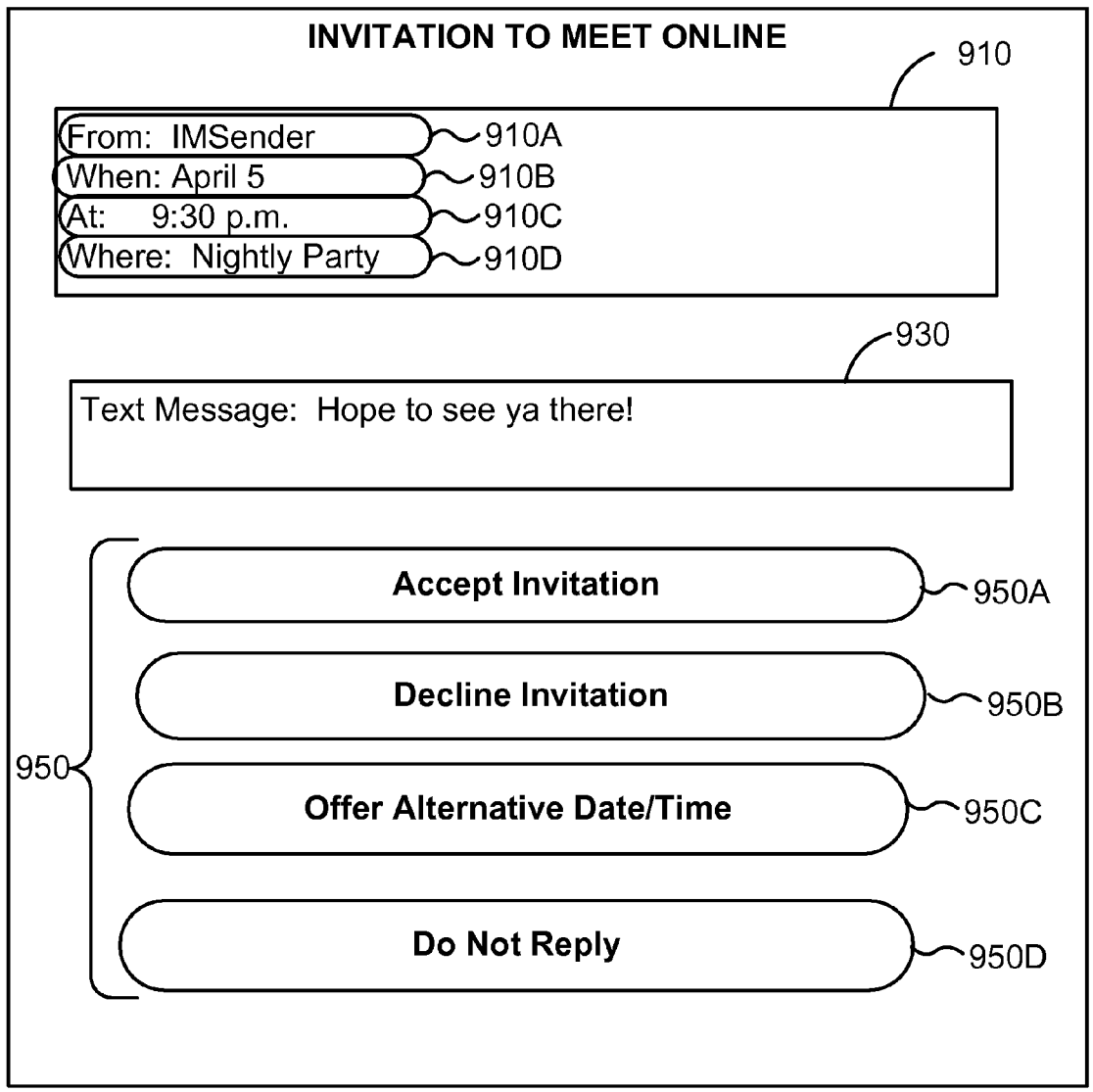
FIG. 9 is an illustration of an example interface for an electronic chat room invitation.

FIG. 9 illustrates a chat room invitation interface 900 that may be presented on the invitee's display. The chat room invitation interface 900 includes an invitation information portion 910. The invitation information portion 910 identifies the user 910A (i.e., "IM Sender") issuing the invitation, the date 910B (i.e., "April 5") and time 910C (i.e., 9:30 p.m.") for which the invitee is being invited, and a chat room identifier 910D (i.e., "Nightly Party") where the invitee is to meet the sender.

The chat room invitation interface 900 also includes an optional text message 930 and controls 950. An accept control 950A is operable to indicate the invitee's acceptance of the invitation (e.g., willingness to meet at the designated date, time and place). A decline control 950B is operable to send an IM or another type of communication to the sender to inform the sender that the invitee is unwilling or unable to accept the invitation to meet. In some implementations, an edit control 950C (i.e, "Offer Alternative Date/Time") is operable to permit an invitee to change the meeting information or send an alternative invitation to the sender. The chat room invitation interface 900 also, through the exchange of instant messages, enables negotiation of meeting arrangements during the invitation process. A control 950D enables an invitee to remove the chat room invitation interface 900 without replying.

Figure 10:
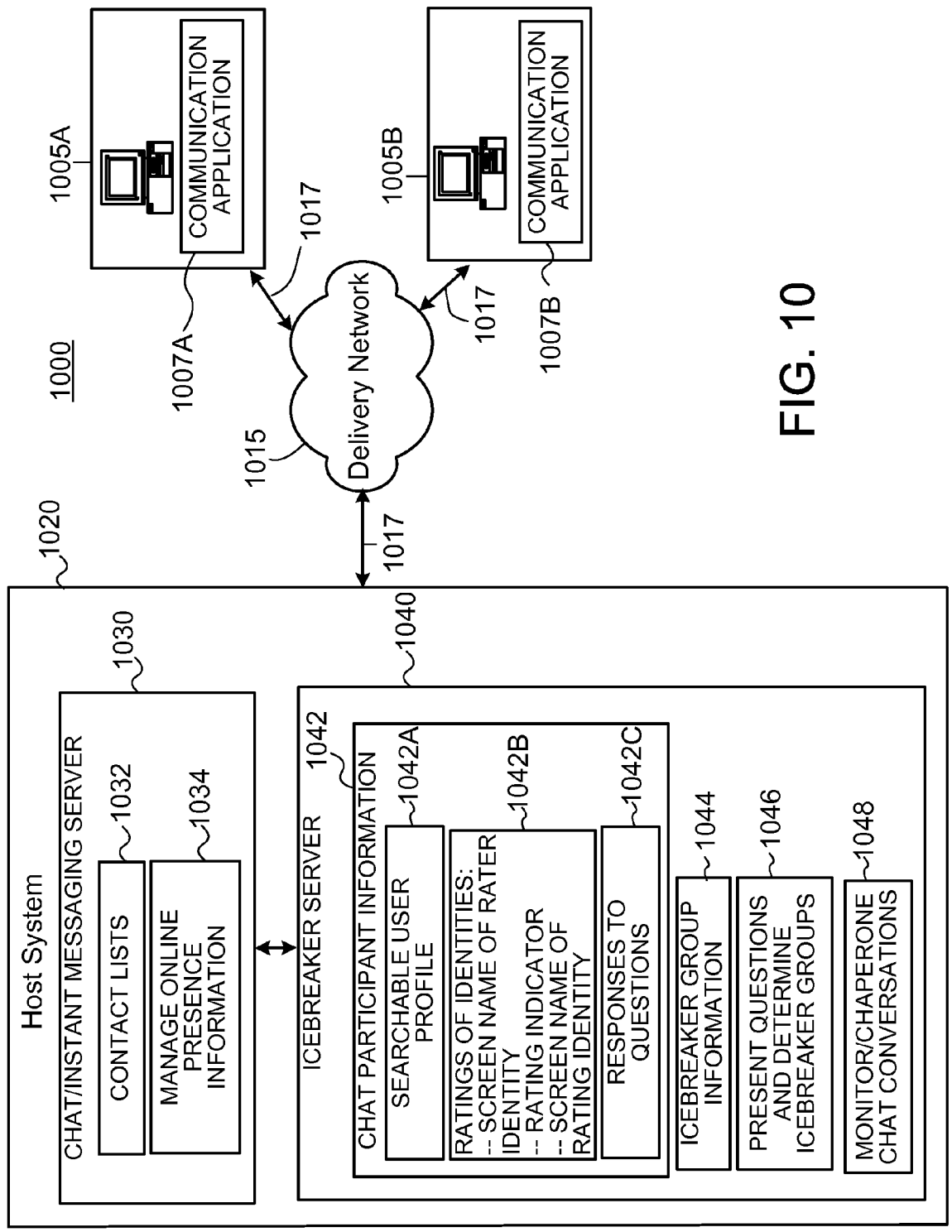

FIG. 10 shows a communications system 1000 that is capable of using a BOT to facilitate chat communications among client systems 1005A and 1005B. For brevity, only two client systems 1005A and 1005B are shown, however, actual implementations may have hundreds or thousands of client systems.

More particularly, users of the communications system 1000 are distributed geographically and use client systems 1005A and 1005B to access a chat application and chat with other chat participants. A network 1015 interconnects the client systems 1005A and 1005B. The client systems 1005A and 1005B are connected to network 1015 through various communication paths 1017, such as a modem connected to a telephone line using, for example, serial line internet protocol (SLIP) or point-to-point protocol (PPP), or a direct network connection using, for example, transmission control protocol/internet protocol (TCP/IP). The host 1020 also is connected to the network 1015 over communication pathway 1017 and is used to facilitate some direct or indirect communications between a host system 1020 and client systems 1005A and 1005B.

Each of the client systems 1005A and 1005B may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The client systems 1005A and 1005B may receive instructions from, for example, a software application, a program, a piece of code, a device, a computer, a computer system, or a combination thereof, which independently or collectively direct operations, as described herein.

The client systems 1005A and 1005B include communications applications 1007A and 1007B having instructions to facilitate communications between the host system 1020 and the client systems 1005A and 1005B. For instance, such communications applications may include e-mail programs, instant message programs, file transfer protocol (FTP) programs, and voice over Internet protocol (VoIP) programs. Another example of a communications application is a web browser or an application-specific program for communicating with the host system 1020. The instructions may be embodied permanently or temporarily in any type of machine, component, equipment, storage medium, or propagated signal that is capable of being delivered to the client systems 1005A and 1005B for execution.

The communication applications 1007A or 1007B also may include contact lists that include communications identities ("friends") with which messages are exchanged using the respective client systems 1005A and 1005B. For example, the messages exchanged may be instant messages, electronic mail (e-mail) messages, text messages or audio messages, including voice messages.

More particularly when the communication applications 1007A or 1007B are instant message applications, the instant message applications 1007A and 1007B include a contact list for each user that uses the client systems 1005A and 1005B to send and receive instant messages. The contact list also may be referred to as a participant list or a friend list. The instant message applications 1007A and 1007B enable the users to send and receive instant messages with the client systems 1005A and 1005B. Instant messages are sent between users of the client systems 1005A and 1005B through an instant message server 1030 on the host system 1020. In one example, a contact list may be a BuddyList® of AOL Instant Messenger® available from America On-line, Inc. of Dulles, Va.

The client systems 1005A and 1005B include a communications interface (not shown) used by the communications programs to send communications through network 1015. The communications may include e-mail, audio data, video data, general binary data, or text data (e.g., encoded in American Standard Code for Information Interchange (ASCII) format). Client systems also include one or more input devices, such as a keyboard, a mouse, a stylus, or a microphone, as well as one or more output devices, such as a monitor, a touch screen, speakers, or a printer.

The network 1015 typically includes a series of portals interconnected through a coherent system. Examples of the network 1015 include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line of various types (DSL)), or any other wired or wireless network. The network 1015 may include multiple networks or subnetworks, each of which may include, for example, a wired or wireless data pathway.

As with the client systems 1005A and 1005B, the host system 1020 may be implemented using, for example, a general-purpose computer capable of responding to and executing instructions in a defined manner, a special-purpose computer, a workstation, a server, a device, a component, or other equipment or some combination thereof capable of responding to and executing instructions. The host system 1020 may receive instructions from, for example, a software application, a program, a piece of code, a device, a computer, a computer system, or a combination thereof, which independently or collectively direct operations, as described herein. These instructions may take the form of one or more communications programs. Such communications programs may include, for example, e-mail programs, instant message programs, FTP programs, and VoIP programs. The instructions may be embodied permanently or temporarily in any type of machine, component, equipment, storage medium, or propagated signal that is capable of being delivered to the host system 1020.

Further, the host system 1020 includes a communications interface (not shown) used by the communications programs to send communications through network 1015. The communications may include e-mail, audio data, video data, general binary data, or text data (e.g., encoded in American Standard Code for Information Interchange (ASCII) format).

The host system 1020 includes an instant messaging server 1030 that operates instant messaging server software configured to process communications sent from and received by users of an instant messaging service. In particular, the instant messaging server 1030 is configured to exchange instant messages and communications related to the instant message service between the client systems 1005A and 1005B and the provider system 1020 over the network 1015. The instant message server 1030 may initiate a point-to-point connection with the client systems 1005A and 1005B, and/or may route instant messages sent with the communication applications 1007A and 1007B.

The instant messaging server 1030 includes contact lists 1032 that are associated with instant messaging user accounts (e.g., a screen name or other type of instant message identity identifier). The people listed in the contact lists 1032 may be referred to as contacts or friends. Each contact information entry in the contact list 1032 may identify a screen name (or other type of instant message address or identity identifier) for a contact of the instant message identity to whom the contact list 1032 applies (e.g., sender). In some implementations, the address book may include additional information, such as a name, mailing address information, and telephone numbers. Some implementations may refer to a contact list by other terms, such as address book or user information.

The instant messaging server 1030 also includes code segments 1034 to manage on-line presence information. The code segments 1034 indicate to the instant message server whether the users listed in contact list 1032 are on-line (e.g., signed in to the instant message service). The code segments 1034 also indicate whether the users in contact list are offline (e.g., not signed in to the instant messaging service).

The host system 1020 also includes a chat server 1040 operable to use a BOT to facilitate chat communications. The chat server 1040 stores user information in storage area 1042. The user storage area 1042 may be implemented using a database, though a database need not necessarily be used. The user storage area 1042 includes, for each chat participant, a user profile 1042A that includes an identifier (e.g., a screen name) and demographic and other types of information about the user. At least a portion of the user profile information is searchable by other chat participants. The user storage area 1042 further includes subjective ratings 1042B made by the chat participant regarding the chat participant's interaction with other chat participants in an icebreaker group or otherwise in a chat room. Each subjective rating identifies the screen name of the chat participant who made the rating, the screen name of the chat participant to whom the rating applied, and a rating indicator that represents the chat participant's subjective impression or experience of interacting with the chat participant who is the subject of the rating. The user storage area 1042 also includes responses 1042C made by the chat participant to multiple-choice or open-ended questions. In some implementations, the user storage area 1042 also may include indicates of the types of remarks that a chat participant has found to be unwelcome and/or risqué remarks that a chat participant has found to be welcome.

The chat server 1040 also maintains a data store 1044 for icebreaker group information, including the chat participants who are or were associated with a particular icebreaker group, as well as the date and time of the icebreaker group. The chat server 1040 also maintains a data store 1045 for questions presented to chat participants and, in the case of multiple-choice questions, selectable answers to a question.

The chat server 1040 also includes code segments 1046 that, when executed, present multiple-choice questions to a chat participant and identify an icebreaker group based, at least in part, on responses to some or all of the multiple-choice questions. For example, the code segments 1046 may implement a process similar to process 400 of FIG. 4 or may display a user interface similar to, or including aspects of, one of the user interfaces of FIGS. 2A-2C.

The chat server 1040 may execute code segments 1048 to monitor chat communications in a icebreaker group or chat room. The code segments 1048 may implement a process similar to, or including aspects of, process 500 of FIG. 5 or may display a user interface similar to, or including aspects of, user interfaces 600, 700, 800, or 900 of FIGS. 6-9, respectively.

FIGS. 11-19 illustrate example interfaces of an implementation of a chat application using a BOT to facilitate chat communications. In general, the implementation includes a group chat room in which chat participants are randomly associated with a small group of chat participants within the chat room and a premium service in which a BOT hosts a private on-line party to which only invited guests participant. The BOT provides content to help start and keep the conversation flowing. A private on-line party host represents one mechanism for monetizing chat, though a private on-line party need not necessarily be fee-based. For example, a private on-line party may be available only to chat participants that register with the chat service (but do not pay a monthly or special fee to participate in the chat service). In this example implementation, the group chat room is available to chat service members who pay a monthly fee to access an Internet service provider. In some implementations, the group chat room may be publicly available.

In the example implementation of FIGS. 11-19, the chat room is referred to as "The Icebreaker" and is designed as a chat room where people can electronically gather during the evening to socialize and meet other chat participants. As such, the Icebreaker is a nightly party or on-line event. The host of the Icebreaker is a BOT that is presented as an animated human head and is referred to as "ChettheChatman." The BOT spends time with each chat participant and then introduces the chat participant to others in the chat room. To do so, the BOT exchanges communications to welcome each chat participant, asks each chat participant some questions, and lets the chat participant know how the chat experience is to proceed. The BOT's questions are programmed nightly and meant to solicit responses that reveal character and judgment of a chat participant. The questions are also intended to be fun and quick to answer. Some of the BOT's questions are multiple choice, whereas other questions are open ended. A chat participant's answers to the multiple-choice questions are perceivable to all chat participants to see. The answers to the multiple-choice questions, user profile information, a chat participant's photo and an icon selected by the chat participant populate the chat participant's Icebreaker Infosheet that is perceivable by other chat participants in the chat room. Only chat participants who pay for a private, premium party are able see the answers to open ended questions, which are generally meant to be provocative.

Once the initial message exchange between the BOT and the chat participant is completed, the BOT introduces the chat participant to a small group of other chat participants. This group is chosen randomly without the use of user profile or answers to the BOT's questions.

The BOT stimulates conversation in the small group in any of a number of ways. In one example, the BOT introduces a topic for discussion. In another example, the BOT reveals what a few chat participants answered to the questions when the chat participants entered the chat room. In yet another example, the BOT may introduce a few multiple choice questions to get new answers from one or more of the small group chat participants that then can be discussed. In this free group chat, each chat participant sees the comments of the other chat participants. An inappropriate language filter can be turned on if a chat participant wants to filter inappropriate language.

The BOT leaves the partygoers alone once they get going. The BOT sends a message that the BOT is leaving to go throw a private party, which introduces and advertises the private party concept to the small group. At this point, chat participants continue to interact within the free small group as long as the chat room is made available. A chat participant also can move to other small party groups that are occurring in the free chat room.

A chat participant also can initiate a private party, in which the BOT controls all conversation and game play between the chat participant and another chat participant. In other words, the chat participants generally respond through the BOT. However, each chat participant is permitted to ask a predetermined number (here, two) of the chat participant's own questions. If a chat participant behaves badly (e.g., uses foul language or makes an inappropriate comment), the BOT calls attention to the inappropriate language and reminds the offender and the other chat participant that anyone can exit the private party (which is referred to "Bailing Out") if the conversation becomes inappropriate. If a participant decides to exit because of offensive behavior by someone else, the chat participant receives credit for use at a future premium party.

The chat service keeps track of chat participants with whom each chat participant has had a private party and how the chat participants in the private party rated each other. The chat service also tracks and manages responses to electronic invitations to private parties. Payment for a private party may be on a pay-per-party basis and may use a pre-paid balance system.

Figure 11:

FIG. 11 shows an example interface 1100 for using a BOT to welcome a chat participant to the chat room experience. The welcome interface 1100 includes a BOT host portion 1110 that introduces the BOT and provides information about how the BOT-facilitated experience is to proceed. The welcome interface 1100 also includes a chat portion 1120 that includes a message history area 1122 showing messages exchanged between the BOT and the chat participant and an edit area 1125 that enables the chat participant to enter a message to be sent to the BOT. The welcome interface 1100 further includes information 1130 on the chat participant's account balance and a control to enable the chat participant to purchase additional private party time. The welcome interface 1100 also includes a control 1140 for a chat participant to view the chat participant's own Icebreaker Info sheet.

Figure 12:

Referring also to FIG. 12, an example interface 1200 shows messages 1222 illustrating the BOT's multiple-choice questions and the chat participant's responses. The chat participant's responses are shown on the chat participant's Icebreaker Info sheet and are perceivable to all other chat participants.

Figure 13:
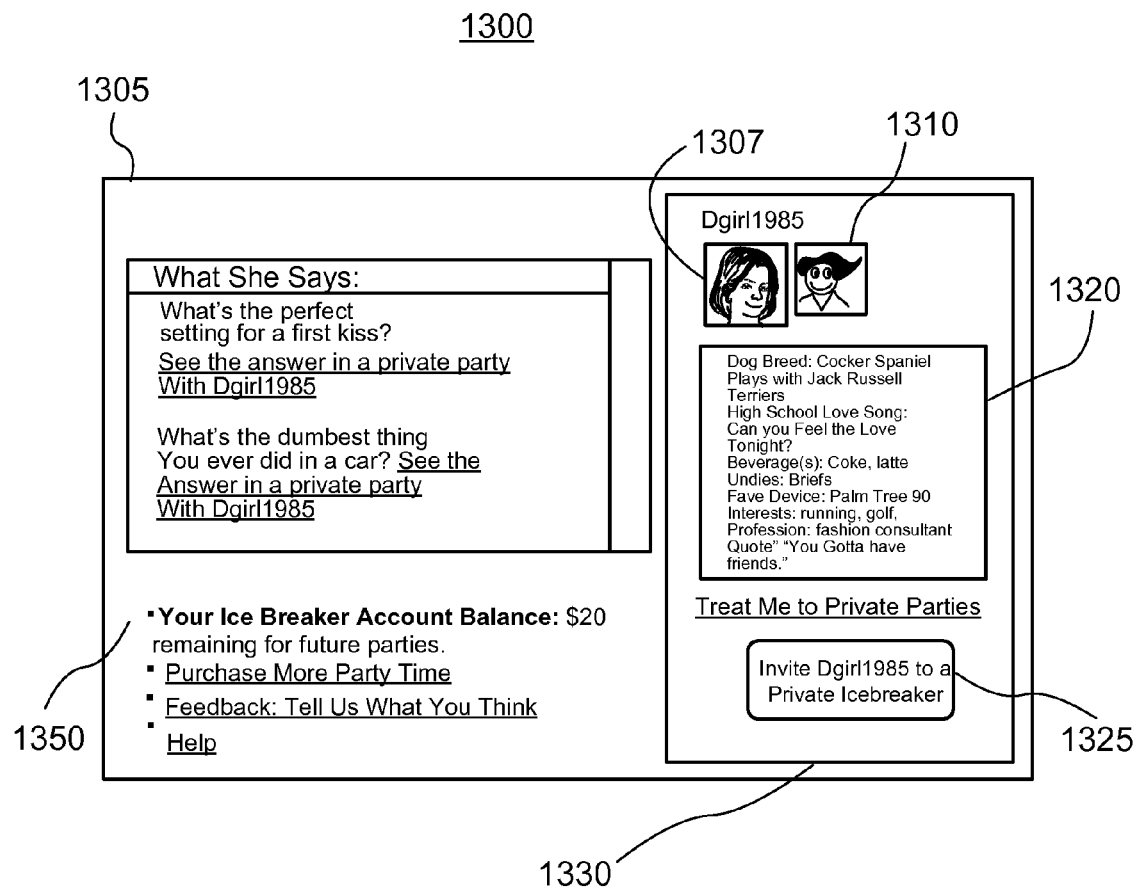

FIG. 13 depicts an example interface 1300 for an Icebreaker Info sheet for a chat participant. The interface 1300 includes the screen name 1305, a photo 1307 and an animated icon 1310 associated with the chat participant. The interface 1300 also includes information 1320 (which may be referred to as "personal factoids") about the chat participant, including answers to the BOT-presented multiple-choice questions and user profile information (such as profession and favorite quote). The interface 1300 further includes an indicator 1325 of whether the chat participant is willing to share the cost of a premium party and a control 1330 for inviting the chat participant to a private party. The interface 1300 also includes the open-ended questions 1330 to which the chat participant's answers can be viewed only during a private party with the chat participant.

Figure 14:
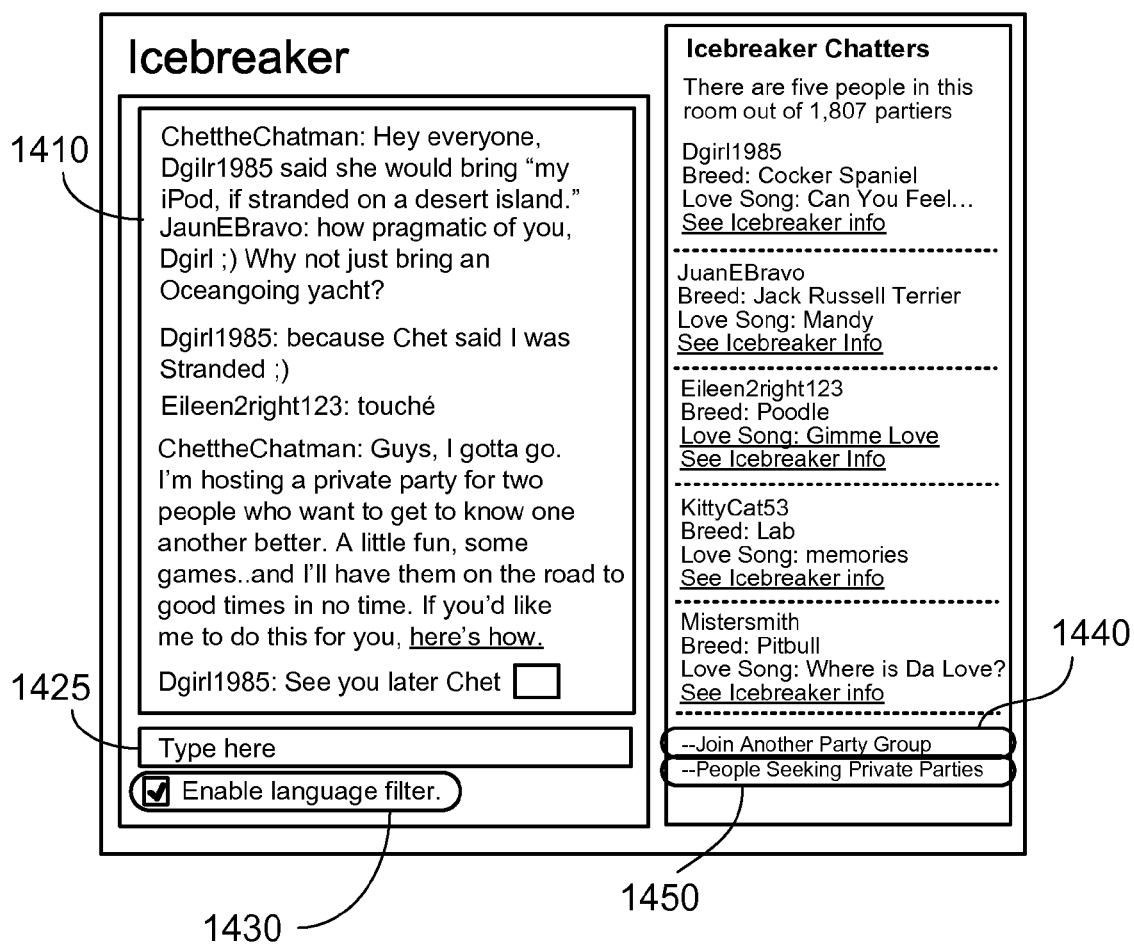

FIG. 14 shows an example interface 1400 of a small group chat. The interface 1400 includes small group participant list 1405 and a chat display area 1410 to display the messages exchanged in the chat session with the small group. The interface 1400 also includes an edit box 1425 through which a chat participant converses with other chat participants by typing a line of text in an edit box 1425 and pressing the ENTER key of the keyboard.

The interface 1400 further includes an checkbox 1430 to control whether an inappropriate language filter is enabled, a control 1440 operable to enable the chat participant to join another small group, and a control 1450 operable to see a list of chat participants who are seeking to initiate private parties with other chat participants.

FIG. 15 illustrates an example interface 1500 that identifies chat participants who are seeking to initiate private parties with other chat participants. The interface 1500 includes a list 1505 of chat participants and, for each chat participant, an indication whether the chat participant is willing to share the cost of a private party. An indicator 1505A indicates that the associated chat participant is willing to share the cost (e.g., "will go Dutch Treat"), whereas indicator 1505B indicates that the associated chat participant is not willing to share the cost (e.g., "Treat Me to a Private Party").

The interface 1500 also includes a control 1510 to add the chat participant to the list of chat participants seeking private parties and a control area 1520 that enables the chat participant to search for chat participants based on Icebreaker Info sheet information. The interface 1500 further includes account information 1530 and controls to increase the chat participant's private party account balance.

Figure 16:
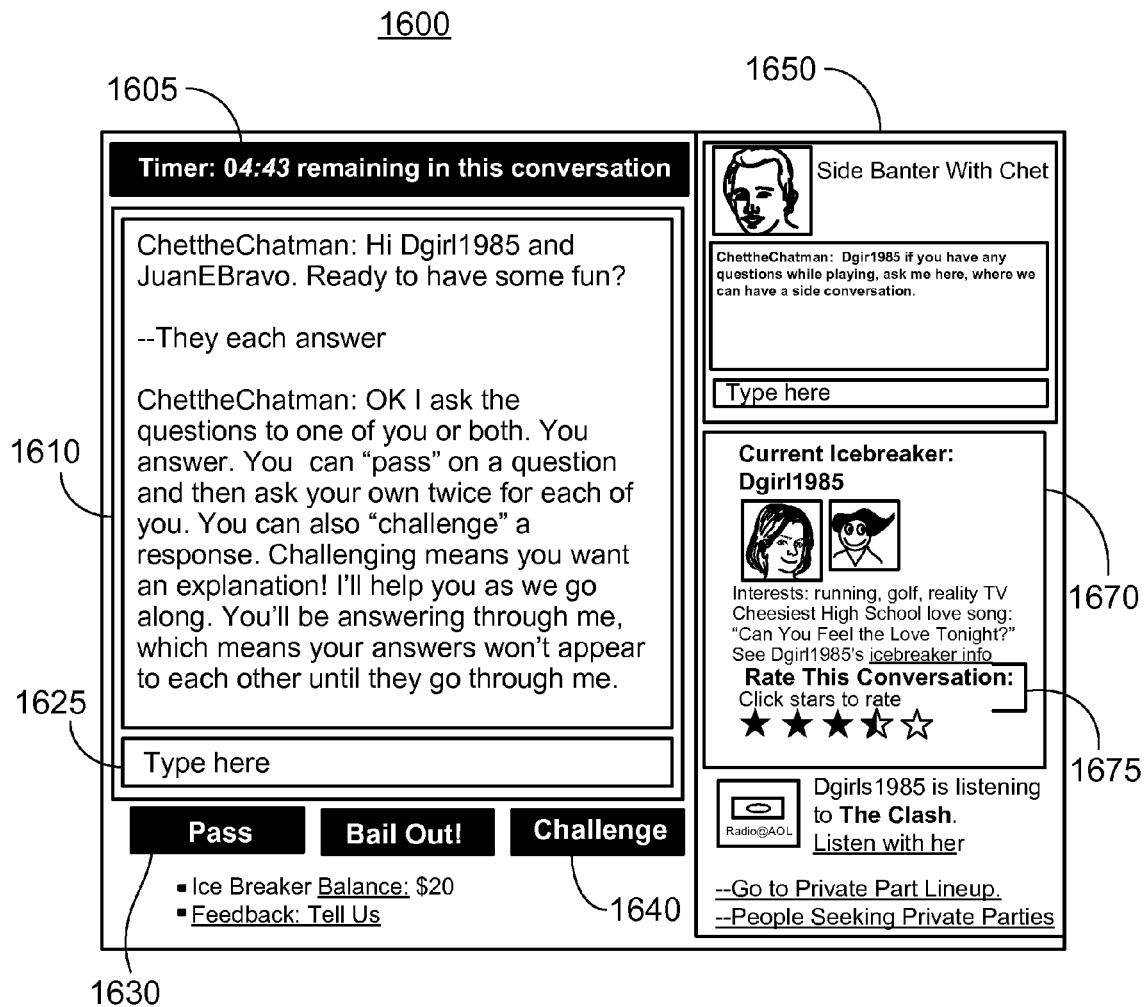

FIG. 16 illustrates an example interface 1600 of a private party hosted by the BOT. The interface 1600 includes a visual timer 1605 that indicates the amount of time remaining in the private party. Some implementations may also or alternatively include an audio timer. The interface also includes a chat display area 1610 to display the messages exchanged in the chat session and an edit box 1625 through which a chat participant converses with another chat participant by typing a line of text in an edit box 1625 and pressing the ENTER key of the keyboard.

The interface also includes a control 1630 to indicate that the chat participant does not wish to answer a question posed by the BOT and a control 1640 operable to enable the chat participant to challenge the other chat participant to answer a question posed by the chat participant. The interface 1630 also includes a side chat portion 1650 that enables the chat participant to privately chat with the BOT. The Icebreaker Info sheet 1670 of the chat participant and/or the other chat participant is displayed and a rating control 1675 is provided to enable the chat participant to rate the interaction.

Referring to FIG. 17, an example interface 1700 shows messages 1700 exchanged in a private party. As illustrated, the BOT directs questions at both or either chat participant, and chat participant responses generally are only seen in response to a BOT question. However, a chat participant may ask a question directly to the other chat participant by activating the challenge control 1740. A chat participant is permitted a predetermined number of challenge questions (here, two questions) per private party. A chat participant is permitted to refuse to answer any question by activating the pass control 1730.

Figure 18:
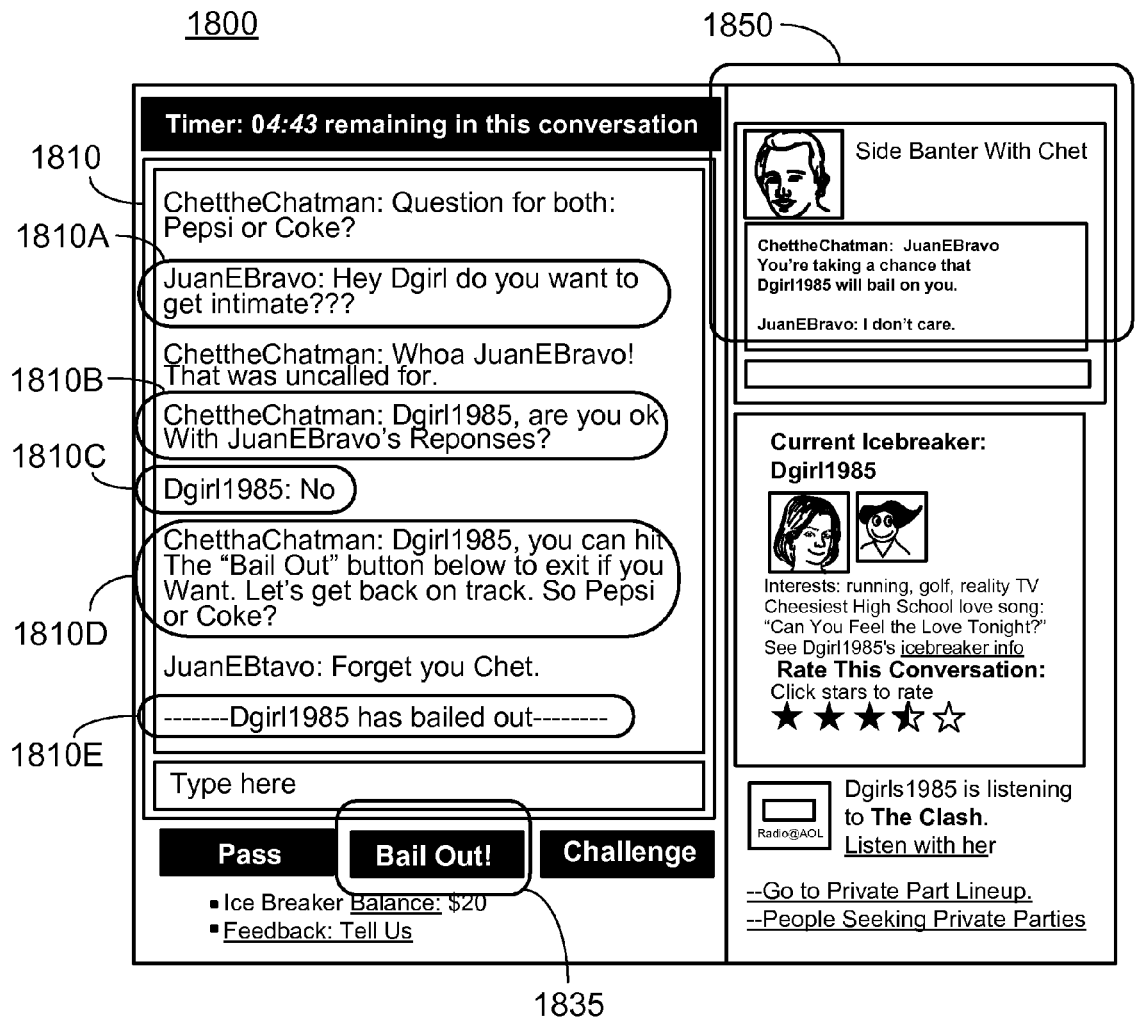

FIG. 18 depicts an example interface 1800 illustrating how inappropriate remarks are handled. As shown in a sample 1810 of the messages exchanged during the private party, a first chat participant, rather than answering the question posed by the BOT, makes an inappropriate remark directed toward the second chat participant in message 1810A. The BOT publicly questions the second chat participant whether the remark is offense in message 1810B. The BOT also sends a private message to the first chat participant that is displayed in a side chat portion 1850, where the private message is not perceivable by the second chat participant. In response to the second chat participant indication that the message was unwelcome in message 1810C, the BOT publicly informs, in message 1810D, both chat participants that the second chat participant may exit the private party by activating the "Bail Out" control 1835. In response to the second participant exiting the private party by activating the "Bail Out" control 1835, a message 1810E is displayed that indicates the second chat participant has exited. In some implementations, if the second chat participant had not indicated that the remark in message 1810A was unwelcomed, the BOT may nonetheless have informed the second chat participant about the exit option.

Figure 19:

FIG. 19 shows an example interface 1900 that lists chat participants 1905 to whom a first chat participant has sent electronic invitations and from whom invitations have been received. For each chat participant listed in list 1905, a control 1905A is provided to view the chat participant's Icebreaker Info sheet. When the chat participant has previously interfaced with the chat participant in a private party, the respective interaction ratings 1905B of both chat participants are displayed. An indication of the party time and date is provided for each accepted invitation, as illustrated in party-time indicator 1905C.

In some implementations, the BOT facilitating chat communications may be represented as an avatar. The BOT avatar may be animated based on the message sent between a BOT and another chat participant in the chat room. For example, the chat application interface may be configured to detect entry of predetermined or user-defined character strings, and to relate those character strings to predefined animations of an avatar. The avatar representing the BOT is animated in the recipient's chat application interface. The avatar may be rendered based on an animation model including a mesh that defines, using polygons, the form of the avatar, a texture that defines an image to covers the mesh of the avatar, and a light map that defines the effect of a light source on the avatar. The animation model for the avatar may include particular geometry, including at least one thousand polygons in the underlying wire model that makes up the avatar's mesh, and at least twenty blend shapes, each of which defines a different facial expression or shape. The animation model may include multiple animations capable of being rendered for the avatar defined by the animation model and being capable of association with one or more sound effects. The animation model for the avatar may include only a face and/or a face and neck of the avatar.

In some implementations, BOT-facilitated chat communications may be provided for some chat participants in a chat room and not provided for other chat participants. For example, the use of a BOT to facilitate chat communications may be provided based on the number of chat participants in a chat room (e.g., when fewer chat participants are in a chat room, a BOT may not necessarily be provided). Additionally or alternatively, a chat participant may activate or deactivate the use of a BOT to facilitate the chat participant's experience in a chat room.

Although the concepts and techniques have been described generally with regard to a computer system, the concepts and techniques also may be applicable to mobile communication devices, such as, for example, a mobile telephone, a personal communication device or a personal digital assistant (PDA) that is configured to access the Internet or another type of computer or communications network.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used. Accordingly, other implementations are within the scope of the following claims.

What is claimed is:

1. A computer program product tangibly embodied in a computer readable medium, the computer program product including instructions that, when executed, facilitate on-line communication among multiple instant messaging identities, the computer program product configured to cause a computer to:
   detect presence of a target instant messaging identity in a chat room that is accessible over a network of computers to instant messaging identities and who desires interaction with other instant messaging identities who are presently on-line in the chat room;
   present questions to the target instant messaging identity, at least one of the questions including selectable responses associated with the question;
   receive, from the target instant messaging identity, responses to the questions;
   access, from computer-accessible memory, stored responses to the questions, at least one of the stored response having been received from another instant messaging identity and being associated with the other instant messaging identity who provided the response;
   compare responses received from the target instant messaging identity to the accessed stored responses;
   identify, based at least in part on results of the comparison, a group of less than all of instant messaging identities who are currently on-line; and
   use an instant messaging identity representing an instant messaging robot to introduce the identified group of instant messaging identities who are currently on-line to the target instant messaging identity and to introduce the target instant messaging identity to the identified group of instant messaging identities who are currently on-line.

2. The computer program product of claim 1 further configured to cause the computer to monitor interaction between the target instant messaging identity and the identified group of instant messaging identities.

3. The computer program product of claim 2 wherein monitoring interaction comprises monitoring interaction between the target instant messaging identity and the identified group of instant messaging identities to regulate interaction within bounds determined by the target instant messaging identity.

4. The computer program product of claim 1 further configured to cause the computer, based on detection of a predetermined condition, to use the instant messaging identity representing the instant messaging robot to interact with the target instant messaging identity or one of the instant messaging identities in the identified group of instant messaging identities.

5. The computer program product of claim 1 wherein comparing responses received to accessed stored responses comprises converting a received response into a representative code and comparing the representative code to stored codes corresponding to and representative of responses having been received from the other instant messaging identity.

6. The computer program product of claim 1 further configured to cause the computer to:
   store, in computer-accessible memory, information gleaned from interaction between the target instant messaging identity and the identified group of instant messaging identities, the information being stored in association with the target instant messaging identity; and enable access to the stored information associated with the target instant messaging identity in a later communication session.

7. The computer program product of claim 6 wherein the stored information associated with the target instant messaging identity comprises a searchable user profile associated with the target instant messaging identity.

8. The computer program product of claim 1 further configured to cause the computer to:
receive, from the target instant messaging identity, a rating about an interaction with another instant messaging identity in the identified group of instant messaging identities; and
store, in computer-accessible memory, the rating about the instant messaging identity in association with the target instant messaging identity for later use in identifying a second group of less than all of instant messaging identities to be associated with the target instant messaging identity.

9. The computer program product of claim 8 further configured to cause the computer to:
access, from computer-accessible storage, interaction ratings associated with the target instant messaging identity; and
identify, based on results of the comparison and the accessed interaction ratings, a group of less than all of instant messaging identities who are currently on-line.

10. The computer program product of claim 8 further configured to cause the computer to:
access, from computer-accessible storage, interaction ratings associated with the target instant messaging identity; and
identify, based on results of the comparison and the accessed interaction ratings, a group of less than all of instant messaging identities who are currently on-line such that the identified group does not include an instant messaging identity with whom the target instant messaging identity reported a prior negative interaction.

11. The computer program product of claim 8 further configured to cause the computer to:
access, from computer-accessible storage, interaction ratings associated with the target instant messaging identity; and
identify, based on results of the comparison and the accessed interaction ratings, a group of less than all of instant messaging identities who are currently on-line such that the identified group includes an instant messaging identity with whom the target instant messaging identity reported a prior positive interaction.

12. The computer program product of claim 1 further configured to cause the computer to:
receive, from the target instant messaging identity in a later communications session, an indication of an instant messaging identity to be invited to the chat room;
enable transmission of an invitation to the invited instant message participant, wherein the invitation includes a suggested meeting time and a revise control operable to enable the invited instant messaging identity to indicate a different meeting time;
receive an indication of a different meeting time; and
communicate the different meeting time to the target instant messaging identity.

13. The computer program product of claim 1 wherein the questions comprise a series of multiple-choice questions.

14. The computer program product of claim 1 wherein the questions change periodically.

15. The computer program product of claim 14 wherein the questions change on a nightly basis or a weekly basis.

16. The computer program product of claim 1 wherein the chat room comprises a chat room For on-line dating.

17. The computer program product of claim 1 wherein the chat room comprises a chat room for on-line dating that is only available to instant messaging users during a predetermined daily time period.

18. The computer program product of claim 1 further configured to cause the computer to associate the identified group of instant messaging identities and the target instant messaging identity.

19. A method, performed at least partially on a computer, for facilitating on-line communication among multiple instant messaging identities, the method comprising:
detecting presence of a target instant messaging identity in a chat room that is accessible over a network of computers to instant messaging identities and who desires interaction with other instant messaging identities who are presently on-line in the chat room;
presenting questions to the target instant messaging identity, at least one of the questions including selectable responses associated with the question;
receiving, from the target instant messaging identity, responses to the questions;
accessing, from computer-accessible memory, stored responses to the questions, at least one of the stored response having been received from another instant messaging identity and being associated with the other instant messaging identity who provided the response;
comparing responses received from the target instant messaging identity to the accessed stored responses;
identifying, based at least in part on results of the comparison, a group of less than all of instant messaging identities who are currently on-line; and
using an instant messaging identity representing an instant messaging robot to introduce the identified group of instant messaging identities who are currently on-line to the target instant messaging identity and to introduce the target instant messaging identity to the identified group of instant messaging identities who are currently on-line.

20. The method of claim 19 further comprising monitoring interaction between the target instant messaging identity and the identified group of instant messaging identities.

21. The method of claim 20 wherein monitoring interaction comprises monitoring interaction between the target instant messaging identity and the identified group of instant messaging identities to regulate interaction within bounds determined by the target instant messaging identity.

22. The method of claim 19 further comprising using the instant messaging identity representing the instant messaging robot to interact with the target instant messaging identity or one of the instant messaging identities in the identified group of instant messaging identities based on detection of a predetermined condition.

23. The method of claim 19 wherein comparing responses received to accessed stored responses comprises converting a received response into a representative code and comparing the representative code to stored codes corresponding to and representative of responses having been received from the other instant messaging identity.

24. The method of claim 19 further comprising:
storing, in computer-accessible memory, information gleaned from interaction between the target instant messaging identity and the identified group of instant messaging identities, the information being stored in association with the target instant messaging identity; and
enabling access to the stored information associated with the target instant messaging identity in a later communication session.

25. The method of claim 24 wherein the stored information associated with the target instant messaging identity comprises a searchable user profile associated with the target instant messaging identity.

26. The method of claim 19 further comprising:
receiving, from the target instant messaging identity, a rating about an interaction with another instant messaging identity in the identified group of instant messaging identities; and
storing, in computer-accessible memory, the rating about the instant messaging identity in association with the target instant messaging identity for later use in identifying a second group of less than all of instant messaging identities to be associated with the target instant messaging identity.

27. The method of claim 26 further comprising:
accessing, from computer-accessible storage, interaction ratings associated with the target instant messaging identity; and
identifying, based on results of the comparison and the accessed interaction ratings, a group of less than all of instant messaging identities who are currently on-line.

28. The method of claim 26 further comprising:
accessing, from computer-accessible storage, interaction ratings associated with the target instant messaging identity; and
identifying, based on results of the comparison and the accessed interaction ratings, a group of less than all of instant messaging identities who are currently on-line such that the identified group does not include an instant messaging identity with whom the target instant messaging identity reported a prior negative interaction.

29. The method of claim 26 further comprising:
accessing, from computer-accessible storage, interaction ratings associated with the target instant messaging identity; and
identifying, based on results of the comparison and the accessed interaction ratings, a group of less than all of instant messaging identities who are currently on-line such that the identified group includes an instant messaging identity with whom the target instant messaging identity reported a prior positive interaction.

30. The method of claim 19 further comprising:
receiving, from the target instant messaging identity in a later communications session, an indication of an instant messaging identity to be invited to the chat room;
enabling transmission of an invitation to the invited instant message participant, wherein the invitation includes a suggested meeting time and a revise control operable to enable the invited instant messaging identity to indicate a different meeting time;
receiving an indication of a different meeting time; and
communicating the different meeting time to the target instant messaging identity.

31. The method of claim 19 wherein the questions comprise a series of multiple-choice questions.

32. The method of claim 19 wherein the questions change periodically.

33. The method of claim 32 wherein the questions change on a nightly basis or a weekly basis.

34. The method of claim 19 wherein the chat room comprises a chat room for on-line dating.

35. The method of claim 19 wherein the chat room comprises a chat room for on-line dating that is only available to instant messaging users during a predetermined daily time period.

36. The method of claim 19 further comprising associating the identified group of instant messaging identities and the target instant messaging identity.

37. A system for facilitating on-line communication among multiple instant messaging identities, the system comprising:
one or more processing devices; and
one or more storage devices, the storage devices storing instructions that, when executed by the one or more processing devices, cause the one or more processing devices to perform the following operations"
detect presence of a target instant messaging identity in a chat room that is accessible over a network of computers to instant messaging identities and who desires interaction with other instant messaging identities who are presently on-line in the chat room;
present questions to the target instant messaging identity, at least one of the questions including selectable responses associated with the question;
receive, from the target instant messaging identity, responses to the questions;
access, from computer-accessible memory, stored responses to the questions, at least one of the stored response having been received from another instant messaging identity and being associated with the other instant messaging identity who provided the response;
compare responses received from the target instant messaging identity to the accessed stored responses;
identify, based at least in part on results of the comparison, a group of less than all of instant messaging identities who are currently on-line; and
use an instant messaging identity representing an instant messaging robot to introduce the identified group of instant messaging identities who are currently on-line to the target instant messaging identity and to introduce the target instant messaging identity to the identified group of instant messaging identities who are currently on-line.

* * * * *